(12) United States Patent
Jones

(10) Patent No.: US 7,376,516 B2
(45) Date of Patent: May 20, 2008

(54) HIGH ACCURACY SURVEY GRADE GIS SYSTEM

(75) Inventor: Robert S. Jones, Delafield, WI (US)

(73) Assignee: R.A. Smith National, Brookfield, WI (US)

( * ) Notice: Subject to any disclaimer, the term of this patent is extended or adjusted under 35 U.S.C. 154(b) by 0 days.

(21) Appl. No.: 11/466,306

(22) Filed: Aug. 22, 2006

(65) Prior Publication Data
US 2007/0050143 A1 Mar. 1, 2007

Related U.S. Application Data

(60) Provisional application No. 60/710,574, filed on Aug. 23, 2005.

(51) Int. Cl.
*G01V 1/00* (2006.01)
*G01S 5/02* (2006.01)

(52) U.S. Cl. .................. 702/14; 342/357.12; 345/440; 358/1.1; 702/5

(58) Field of Classification Search .................. 702/5, 702/14, 16, 150, 158, 160; 701/207, 208; 342/357.12; 345/440; 348/135
See application file for complete search history.

(56) References Cited

U.S. PATENT DOCUMENTS

| | | | |
|---|---|---|---|
| 5,140,532 A * | 8/1992 | Beckwith et al. ............ 358/1.1 | |
| 5,214,757 A | 5/1993 | Maurey et al. | |
| 5,414,462 A | 5/1995 | Veatch | |
| 5,614,913 A | 3/1997 | Nichols et al. | |
| 5,774,826 A | 6/1998 | McBride | |
| 5,986,604 A * | 11/1999 | Nichols et al. ........ 342/357.12 | |
| 6,047,236 A | 4/2000 | Hancock et al. | |
| 2005/0104884 A1* | 5/2005 | Iwata et al. .................. 345/440 | |

OTHER PUBLICATIONS

Alfred Leich, GPS Satellite Surveying, 2nd. Edition, © 1995, Chpts. 12 and 14, pp. 451 to 475 and 486 to 499.
Francis H. Moffitt and Henry Bouchard, Surveying, 9th Edition, © 1992, Chpt. 11, pp. 431 to 499.
Raymond E. Davis, Francis S. Foote, James M. Anderson, Edward M. Mikhail, Surveying, Theory and Practice, 6th Edition, © 1981, Chpt. 14, pp. 564 to 613.
Wisconsin State Cartographer's Office, WLIA, Coordinate Systems Task Force Report, dated Jan. 2006, 2 pages.
Alan P. Vonderohe, WISCRS: Redesign of the WCCS, dated Mar. 2006, 97 pages.
Joseph H. Bell, Geographic Calculator 6.0 Software Review, The American Surveyor, Mar.-Apr. 2004, 3 pages.

* cited by examiner

*Primary Examiner*—John Barlow
*Assistant Examiner*—John Le
(74) *Attorney, Agent, or Firm*—Godfrey & Kahn, S.C.; Alan R. Stewart

(57) ABSTRACT

A method of coordinating surveys of different origins and which may be projected into different coordinate systems. The method provides a translation and rotation of the surveys to be coordinated without disturbing the internal geometry of each survey. A geographic information system including a procedure for coordinating surveys of different origins and/or which surveys which projected in different coordinate systems.

4 Claims, 38 Drawing Sheets

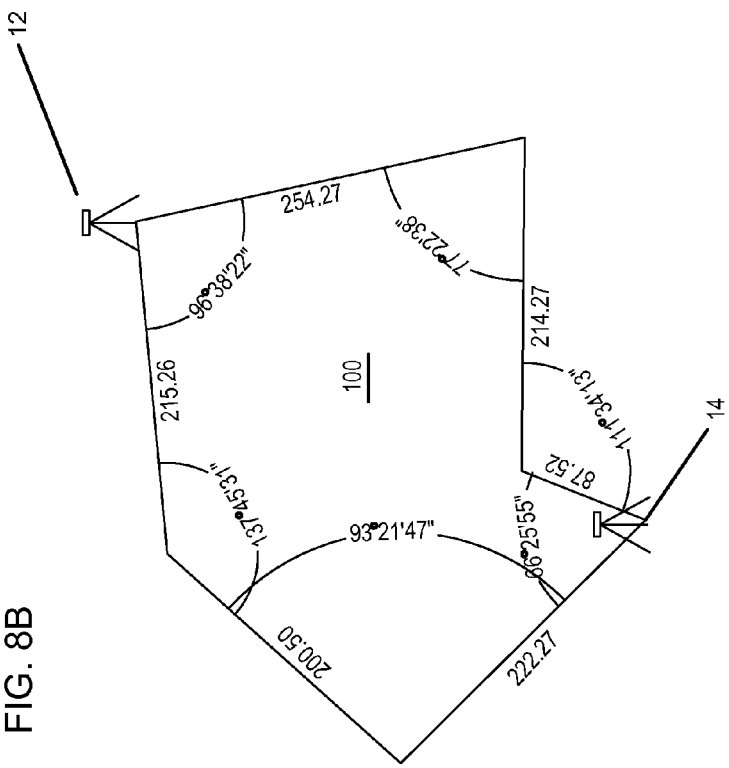
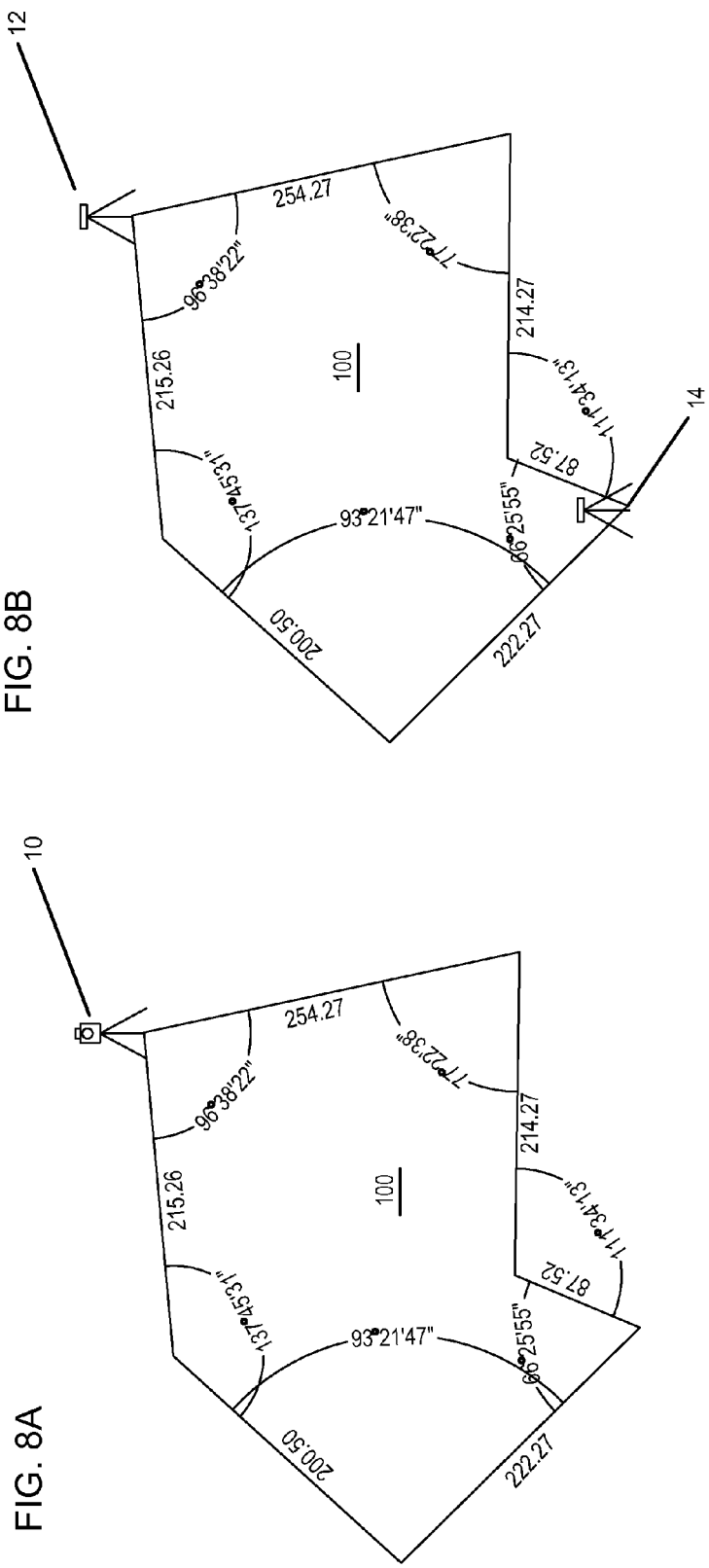
FIG. 8A
FIG. 8B

HIGH ACCURACY SURVEY GRADE GIS SYSTEM

CROSS REFERENCE TO RELATED APPLICATIONS

The present application claims benefit of U.S. Provisional Application Ser. No. 60/710,574, filed on Aug. 23, 2005, and entitled "High Accuracy GIS System," the disclosure of which is incorporated herein by reference.

BACKGROUND

A high accuracy survey-grade geographic information system (GIS) would need to transform distinct isolated land surveys, which could be separated by several miles, onto a common coordinate system that does not distort or scale the dimensions of those surveys. Furthermore, a high accuracy survey-grade GIS would have to position the transformed surveys relative to each other at the same distances that would be measured between them on the ground using transit and tape or electronic distance measure (EDM). Because the purpose of a high accuracy survey-grade GIS is to transform separate isolated surveys onto a common coordinate system in such a manner as to produce in essence one unified survey, in order to be survey-grade the relative positions of the transformed surveys would have to meet the relative positional accuracy standards for ALTA/ACSM land title surveys as adopted by the American Land Title Association and the National Society of Professional Surveyors, which is a member organization of the American Congress on Surveying and Mapping. Those standards state: "'Relative Positional Accuracy' means the value expressed in feet or meters that represents the uncertainty due to random errors in measurements in the location of any point on a survey relative to any other point on the same survey at the 95 percent confidence level. . . . [The] Allowable Relative Positional Accuracy for Measurements Controlling Land Boundaries on ALTA/ACSM Land Title Surveys [is] 0.07 feet (or 20 mm)+50 ppm."

Global Navigation Satellite Systems (GNSS), such as the United States Department of Defense's Global Navigation System (GPS), afford land surveyors the prospect of relating all their surveys to a common spatial reference system based on geodetic latitudes, longitudes, and ellipsoid heights. In theory, the ability to relate all surveys to a common coordinate system opens the door to possible realization of a high accuracy survey-grade GIS. In practice, the hurdles and multiple problems associated with actually designing and implementing a high accuracy survey-grade GIS that can feasibly operate within a survey firm while meeting the accuracy standards leads one to conclude that such a complex system of technology married to the human management of average surveyors and field crews is at best improbable. In the past several years articles have been written and conferences have taken place that address the problem of integrating the requisite high accuracy requirements demanded of land surveys with the far less accurate spatial demands historically placed on the GIS community. The discussions have been largely talk and theorizing with no solutions proposed.

Land surveyors produce many different types of surveys or plats of survey, which are paper plots or scale drawings depicting the dimensions and orientation of a parcel of land in accordance with a written deed or legal description. A survey can include a depiction of physical man made improvements, as well as natural features, such as the topography of the terrain and vegetation. Surveyors obtain the information necessary to produce a survey by using equipment designed to measure the location of individual points on the surface of the earth.

The types of measurement equipment used may include electronic total stations and or dual frequency differential GNSS antennas and receivers that generate positional coordinates by receiving signals from U.S. Department of Defense satellites, Russian Glonass satellites, and in the future a European satellite system called Galileo. For example, if a surveyor needs to locate and dimension a roadway, he will be required to measure the relative location of a sufficient number of individual points on the edge of the road so that when those points are connected by lines or curves, the result is a correct scale rendering of the road.

As points are being measured in the field, the coordinates representing those locations may be stored in a data collector mounted to, connected to or in communication with the measuring instrument. Often, the data collected for a single point location consists of five fields within an electronic or computer point database. Those five fields, in the order most commonly used, are: 1) Point Number, often an arbitrary number automatically generated at the time of measurement and usually consecutively sequenced from the last point number used, it is used to distinguish one point from another, but may also be an assigned identifier; 2) Northing, the Y component in a three dimensional Cartesian coordinate system; 3) Easting, the X coordinate in a three dimensional Cartesian coordinate system; 4) Elevation, the Z coordinate in a three dimensional Cartesian coordinate system; 5) Point description, a code which uniquely identifies what is being located, whether it be a building corner or edge of asphalt. Other information may also be collected simultaneously or contemporaneously with these five data elements.

The electronic field measured point data may then be transferred from the data collector to an office computer of the survey company or firm and then may be imported into survey software that may be used to create a computer aided drafting (CAD) drawing that has an associated point data base with the five or more data fields as described. The CAD software may then be used to connect the dots between the points in the associated point database, based on classifications that may be included in the point description field and on input from the field crew, and may also be used to produce a plat or record of survey which may be printed out on a plotter. CAD drawings and associated point databases may be kept and managed within project folders that may include unique project numbers used to distinguish one survey from another.

The survey and description of real property in the United States has historically proceeded under the fiction that the world is flat. With very few exceptions, written legal or deed descriptions for parcels of land in the United States are based on distances that are measured on the ground in the sense that the distance between two points is measured using a tape or chain held level. Indeed this is the means by which the public lands of the United States have been surveyed and sold off to private owners beginning with the first Land Ordinance passed on May 20, 1785 by the Continental Congress: "An Ordinance for Ascertaining the Mode of Disposing of Lands in the Western Territory. Be it ordained by the United States in Congress assembled, that the territory ceded by individual states to the United States, which had been purchased of the Indian habitants, shall be disposed of in the following manner: . . . The lines shall be measured with a chain; . . ." Legal descriptions for real property may reference adjacent or nearby land or legal features, which may be measurable on the face of the Earth as well. In the interpretation of written legal descriptions to derive a drawing or survey plat of a parcel, it is conventional to derive the location of parcel boundaries with respect to a planar or flat two dimensional Cartesian coordinate system (for the vast majority of surveys this is mandatory because almost all legal descriptions preserve a chain of title from the time they were originally conveyed by the United States). Thus, drawings or other interpretations of property descriptions are drafted from the reference of measurements upon the ground.

It might be of enormous benefit to a surveyor to be able to spatially relate, with high accuracy, all surveys he or she produced. One of the primary benefits is illustrated in FIG. 1. Depicted are four parcels of land, parcels A, B, C and D, showing the parcels' actual physical spatial relationship as measured on the ground. If surveys are produced for Parcels A, B, and C, and if the relative locations of those surveys are known with sufficient accuracy, then the amount of time and effort required to survey Parcel D could be dramatically reduced because four of the property lines of Parcel D are defined by property lines belonging to Parcels A, B, and C. The area over which a given survey or legal description for real property is likely to have influence over the location of adjacent or nearby boundaries of other parcels will generally not exceed several square miles. Of course not being able to predict which combination of surveys will have a bearing on future surveys it would be necessary to be able to spatially relate all surveys produced.

A very important characteristic of most two dimensional Cartesian systems used for legal descriptions is that they have no actual spatial relationship to each other, in many cases not even if two parcels are contiguous. In other words, given the legal descriptions of two parcels of land that are within a half mile of each other, it is not likely that their actual physical spatial relationship can be established based upon the descriptions alone. This is illustrated in FIG. 2, which depicts a possible orientation of the parcel boundaries based on deed or legal descriptions of the same parcels illustrated in FIG. 1. The orientations depicted in FIG. 2 are the orientations that must be used within the CAD drawings and associated point databases to produce plats of survey. Without a common coordinate or grid reference system which may be used to tie these disparate parcels together, the interpretation might result in the parcels "floating about in space," as depicted in FIG. 2.

One way to establish the actual physical spatial relationship between two surveys is to measure from one parcel to the other so as to establish their relative positions. Prior to GNSS, if a surveyor wanted to determine the spatial relationship on the surface of the earth between every survey performed, the surveyor might have to physically traverse on the ground between every one of those surveys using an electronic total station, theodolite, EDM, or other suitable measuring device. Even if it were feasible to do this, it would not be possible to do so with sufficient accuracy due to the large propagation of error that would result. With the advent of GNSS and the coming on line of over 1000 Continuously Operating Reference Station (CORS) control points throughout the United States, the situation has changed with regard to coordinating and referencing different surveying jobs.

A CORS control point is a permanent fixed GPS antenna and receiver that records GPS satellite signals 24 hours a day, 7 days a week, and transmits that data as soon as it is collected to the National Geodetic Survey (NGS) where it immediately becomes available at no cost to anyone with Internet access (NGS is a branch of the National Oceanographic and Atmospheric Administration (NOAA)). The location of every CORS antenna and its electronic phase center is known and monitored with extraordinary accuracy in relation to a comprehensive continental coordinate system and datum called "NAD 83 (CORS)." The coordinates of the CORS are given in terms of geodetic latitude, longitude, and ellipsoid height defined on the WGS84 ellipsoid, a mathematical surface designed to approximate the shape of the earth. These highly accurate coordinates are down loadable from NGS websites. The network of National and Cooperative CORS constitutes the National Spatial Reference System.

An NGS Web site defines the NSRS as follows:

"The National Spatial Reference System (NSRS), defined and managed by the National Geodetic Survey (NGS), is a consistent national coordinate system that specifies latitude, longitude, height, scale, gravity, and orientation throughout the Nation, as well as how these values change with time."

"NSRS consists of the following components:

A consistent, accurate, and up-to-date National Shoreline;

the National CORS, a set of Global Positioning System Continuously Operating Reference Stations meeting NOAA geodetic standards for installation, operation, and data distribution;

a network of permanently marked points including the Federal Base Network (FBN), the Cooperative Base Network (CBN), and the User Densification Network (UDN); and a set of accurate models describing dynamic geophysical processes affecting spatial measurements."

"NSRS provides a highly accurate, precise, and consistent geographic reference framework throughout the United States. It is the foundation for the National Spatial Data Infrastructure (NSDI), a critical component of the 'information superhighway.' NSRS is a significant national resource—one whose value far exceeds its original intended purpose."

Surveyors may use an extremely accurate type of positioning utilizing GPS, known as dual frequency relative positioning, which requires that two or more GPS receivers operate simultaneously receiving and recording satellite data from common satellites. With the two or more GPS receivers operating simultaneously and receiving signals from common satellites, the satellite data recorded by the receivers can be downloaded to a computer and post-processed using software designed for that purpose (GPS that utilizes post-processed vectors is called static GPS). The result is a highly accurate vector within WGS84 defining the relative position of the two GPS antennas. Very importantly, if the absolute position of one of the antennas is known and held fixed within the NSRS, then the vector derived from post-processing is no long relative and determines the absolute position of the second antenna or point.

When surveyors use dual frequency relative positioning GPS, one of the two GPS antennas is usually called a base station and remains positioned over a control point in the ground for many hours at a time, sometimes over successive days. The other antenna and receiver is called the rover and is moved from point to point with short occupation times in order to establish real time kinematic (RTK) GPS vectors or post processed static GPS vectors relative to the base station. If, in addition to deriving RTK and or static vectors between the base station and rover, vectors are also derived between the base station and one or more CORS through static post-processing, then highly accurate absolute positions for both the base station location and the points located by the rover relative to the base station can be computed within the NSRS. Because many large survey firms now employ GPS routinely in connection with most of their surveys, it may be possible for them to practically establish the absolute (within the NSRS or some other encompassing coordinate system) and therefore relative positions of those surveys to a very high degree of accuracy. Any measurement errors in the vectors from three or more CORS to the base station can be adjusted, for example by the method of least squares, holding the published CORS coordinates fixed. Such an adjustment computation may result in positions for the base station, and the associated points within a particular survey job, that exceed in accuracy the positions that could be achieved through the use of conventional traverses run by using electronic total stations and tying the surveys to conventional ground control stations. These higher levels of accuracy can be achieved virtually every time with generally two hours of observation at the base station by post processing base station GPS data with CORS control point data that has been downloaded from NGS websites. The CORS data may have been collected hundreds of miles from the base station and the site of the survey.

A few states in the United States have what are called virtual reference systems (VRS). Europe is blanketed by such systems. A VRS is a network of CORS that immediately relay their data to a central computer that then models the atmospheric corrections over the area encompassed by the network. These atmospheric corrections are then conveyed via cell phone to GPS rovers operating in the field. The result is real time or RTK positions at the rover without the need for a base station set up near the site of the survey. In the United States VRS systems are all operating on the NSRS and NAD 83 (CORS). Therefore a surveyor who is operating in a VRS is automatically establishing a link between local survey points and an encompassing coordinate system, in this case the NSRS.

In order for GPS located points to be usable for spatially relating unconnected surveys in a high accuracy survey-grade GIS their WGS84 latitude and longitude coordinates must be transformed into grid coordinates by defining a map projection. The term "grid" refers to a Cartesian coordinate system that is the result of a map projection. A map projection projects points on a curved surface onto a conical or cylindrical three dimensional surface which can be cut and laid flat, thereby transforming coordinates for points located in three dimensions on a curved and irregular surface into points represented in a flat two dimensional frame. A map projection typically includes an ellipsoid designed to approximate some aspect of the earth's surface (such as, but not limited to, mean sea level) and a conical or cylindrical surface passing through or around the ellipsoid onto which points on the surface of the earth are projected. From a simple geometric standpoint that can be visualized, a projection can be accomplished by projecting lines from the center of the ellipse through points on the surface of the earth (see FIGS. 3, 5). Where the lines intersect the conic or cylinder defines the location of the points in the grid system when the conic or cylinder is cut and laid flat. In most practical applications a map projection is a mathematical operation defined by functions that relate geodetic latitudes and longitudes in a spherical system to X and Y coordinates in a two dimensional Cartesian grid system.

The tradeoff for representing on a flat surface the relative size, shape, and location of figures that exist on a curved surface is that the correct shapes and distances as they exist on the curved surface become distorted on the flat surface. This is evident to anyone who has seen a flat map of the world and noticed that Greenland appears to be larger than the continental United States. The larger the area of the earth depicted using a map projection, the greater the distortion. The converse is also true, as the area of the earth encompassed by a map projection becomes smaller so to can the distortion. Because the areas over which it may be desirable to spatially relate surveys is on the order of several square miles, it becomes possible to design map projections that reduce the difference between grid distances and ground distances to an order well within the measurement tolerances associated with the best practices of land surveying.

Because the coordinates that are produced using GPS are in terms of latitudes and longitudes, which are defined in a three dimensional spherical frame, these coordinate systems cannot be used as a basis for spatially relating legal descriptions which are defined within two dimensional Cartesian coordinate systems, as are required in the development and processing of local land surveys. The local land surveys are typically referenced to a locally optimized coordinate system and may be arranged so that a computed grid distance and a measured ground distance are within an acceptable level of tolerance for any location where the local coordinate system may be used.

It is desirable that improvements to the processing of coordinates for disparate surveying jobs in a particular geographic area be made so that surveys of different origins and dates can be compared and harmonized with each other.

SUMMARY

Virtually real time availability via the Internet of data from the current network of over 1000 Continuously Operating Reference Stations (CORS), in conjunction with a similar availability of precise GPS satellite orbital data (necessary for accurate post processing over long distances), allows any surveyor with dual frequency GPS receivers to determine, with extraordinary accuracy, the location of a point within the NSRS, and therefore a survey within the NSRS, after only several hours of logging satellite data at a base station and post-processing that data to multiple CORS that are hundreds of miles away. The static vectors from three or more CORS can be adjusted by the method of least squares holding the published CORS coordinates fixed. This results in positional accuracy within the NSRS that exceed the day to day conventional traverses run by surveyors using electronic total stations.

Although it is now possible to very accurately determine the physical position all surveys in relation to each other, most plats of survey must be produced and drafted on individual Cartesian coordinate systems that have no spatial relationship. The problem then becomes how to transform the drawings and databases of multiple surveys on multiple unrelated coordinate systems to a common system that results in grid coordinates as being ground coordinates.

County Coordinate Systems, such as those developed for the state of Wisconsin by the Wisconsin Department of Transportation, can in some areas provide one solution to the multi-coordinate system problem. County Coordinate Systems have unique map projections for each county that reduce the difference between grid and ground distances to a negligible level. If two or more points from a survey are tied to the NSRS, which represents an encompassing coordinate system in latitudes and longitudes, and transformed to a map projection for a Wisconsin County Coordinate System, and if these same points exist in the drawing database used to produce the survey, then a relationship exists between the coordinate system in which the survey is produced and the County Coordinate System, where grid distances are virtually ground distances over several miles in many areas of the state of Wisconsin. Transformation of a survey drawing file and associated point database into a County Coordinate System then becomes a simple non-scaled translation and rotation defined by the points common to both systems. In this way otherwise unconnected surveys can be spatially united on a common coordinate system that retains ground distances as grid distances over areas as large as several miles.

GIS software is the ideal engine for transforming multiple surveys into a common coordinate system. GIS software can access drawing databases and GPS post processing/adjustment databases and identify common points. For each survey drawing and point database chosen for transformation, the GIS finds specially tagged points in a GPS post processing/adjustment database in a County Coordinate System. The GIS software then finds the corresponding point numbers in the survey database used to draft each survey. Corresponding coordinates representing the same physical points in two separate coordinate systems define a unique transformation applied to each survey to transform each survey into the appropriate County Coordinate System.

In the process of producing a survey, it is not uncommon for a drawing and associated database to go through several translations and rotations in an attempt to arrive at the best boundary solution. Because the transformation to a County Coordinate System is defined by points that exist within a survey drawing database, translating and rotating that database does not alter the transformation to the county system.

It is an object of this invention to provide a method whereby any number of land survey electronic drawing files, or any electronic drawing representing measured features on the surface of the earth, along with associated or attached point databases, can be spatially integrated and combined with high survey-grade accuracy within a Geographic Information System and not introduce any meaningful distortion in distances as measured on the ground. It is a further object of this invention that the spatial integration will be based on the current condition, in terms of orientation, of the surveys integrated. It is a further object of this invention that the point data and drawing features so integrated can be exported into new drawing and point databases in such a manner that the source of the exported point information can be traced to its original database. It is a further object of this invention that such method will not hinder or disrupt in any way the customary office procedures employed within survey departments to produce plats of survey and to manage point databases.

BRIEF DESCRIPTION OF THE DRAWINGS

The drawings illustrate the best mode presently contemplated of carrying out the invention. In the drawings:

FIG. 8A illustrates a parcel surveyed on the ground using a total station surveying instrument.

FIG. 8B illustrates the parcel of FIG. 8A with two corners of the parcel each occupied by a global positioning system (GPS) receiver.

DETAILED DESCRIPTION OF THE PREFERRED EMBODIMENT

Figure 1:
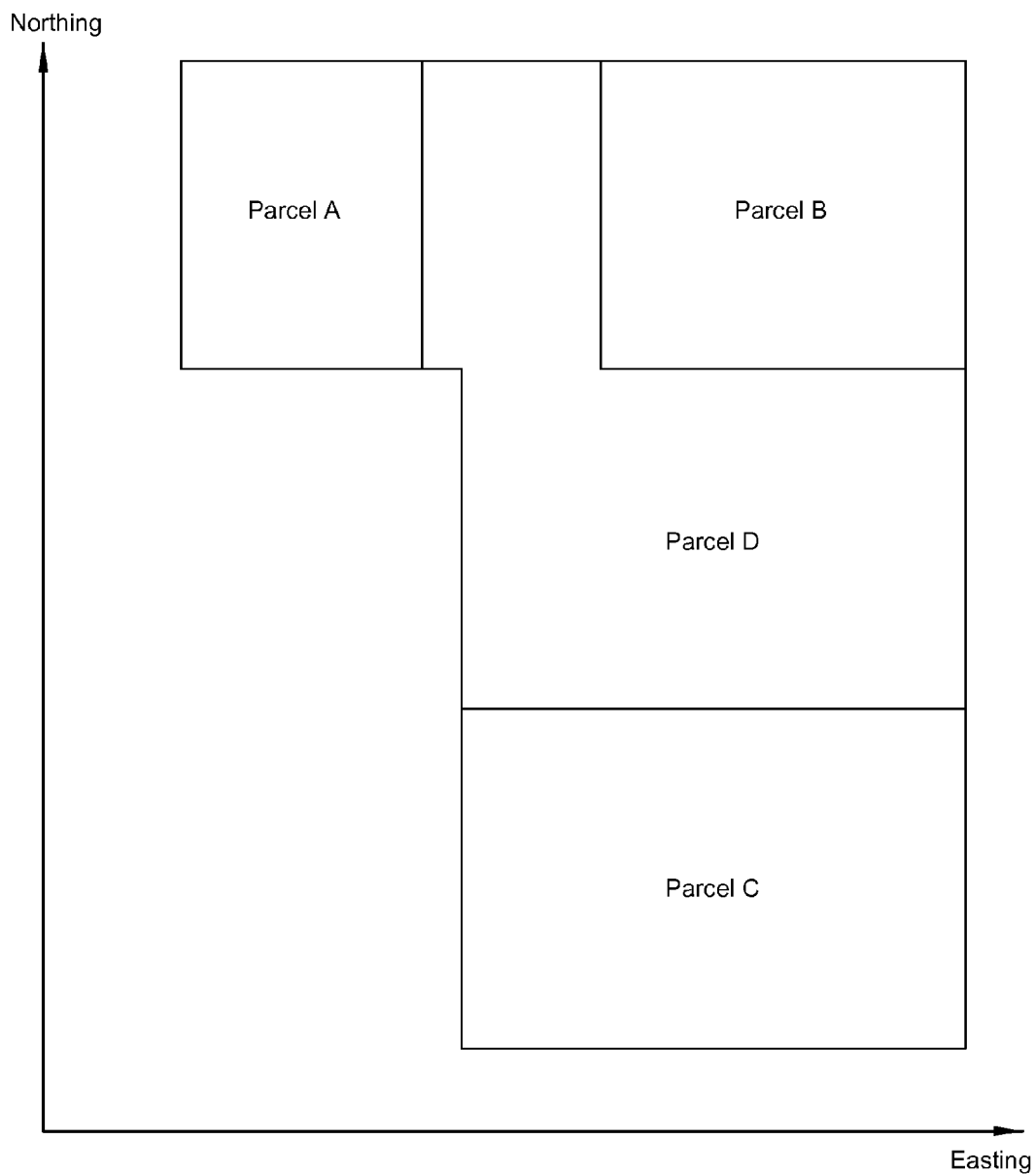
FIG. 1 is a depiction of the actual spatial relationship between four parcels of land.

The survey of real property is typically a blending of legal interpretation with engineering precision to determine the location of a line demarcating legal ownership or other legal interest on the face of the Earth. Once the legal interpretation of the evidence of the location of such delineations has been performed, the lines representing these delineations can then be measured using conventional engineering and surveying techniques. The measurements can then be used to generate maps or other representations (both hardcopy and electronic or digital) of the location of the lines on the surface of the Earth. The accumulation of these lines in a closed traverse is typically done to generate a representation of a parcel of real property rights. As shown in FIG. 1, almost all parcels share lines or boundaries with adjoining parcels.

Surveying a parcel of land typically includes a first task of reviewing information such as recorded plats or legal descriptions written in deeds or other instruments of ownership. From these plats or legal descriptions, a surveyor may go into the field and attempt to locate all of the relevant corners of the parcel on the ground. This can be accomplished through a combination of measuring from other corners of the parcel, recovering prior monuments indicating where the corner may be located, or using other reference marks, monuments or geographic features. Once the corners of the parcel have been located, the actual measurement of the locations can commence. While the plat or legal description may generally locate the parcel on the face of the Earth with reference to existing geographic or legal features, the location of the actual corners of the parcel to be measured is dependent on a set of legal and evidentiary guidelines and the interpretation of the surveyor.

When surveying a particular parcel, examination of one or more earlier surveys of one of more adjacent or nearby surveys might be useful and many times mandatory for the surveyor in determining the lines of the parcel in question. As noted above, a survey of parcel D may be aided by the knowledge of the lines derived during earlier surveys of parcels A, B, and C. Such earlier surveys may be used to verify the location of the common lot line between adjacent parcels. However, even if the existence of a prior survey of an adjacent parcel is known, depending on field measurement data collected and the means of reduction of the data to produce the map or other depiction of the adjacent parcel, the line work of the earlier survey may not be useable by the surveyor of the current survey. This lack of usability of the earlier survey results may be caused by differences in the error tolerances between the earlier survey and the present survey, differences in the map projection used and the coordinate system in which the surveys are to be generated, as well as the use of disparate control points or control reference networks between the surveys.

It is desirable that a common reference framework be used to ensure that surveys at least are tied to a consistent level of control. It is also desirable that the results of surveys be presented in coordinate systems or projections which permit adjacent or nearby surveys to be relatively positioned with respect to each other with a low level of ground distance distortion in the projection of the location of points of a survey into grid coordinates.

Figure 3:
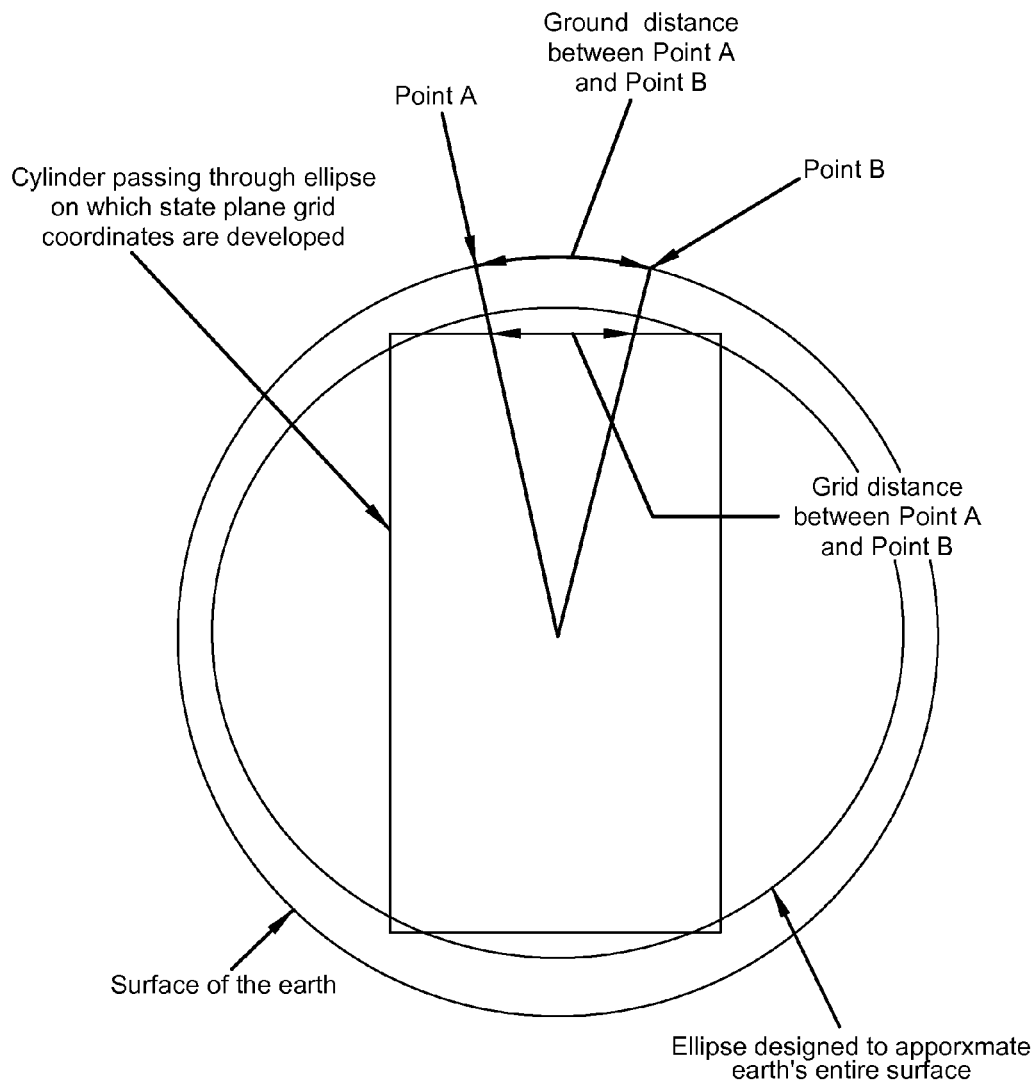
FIG. 3 is an illustration of a State Plane Coordinate system map projection.
Figure 4:
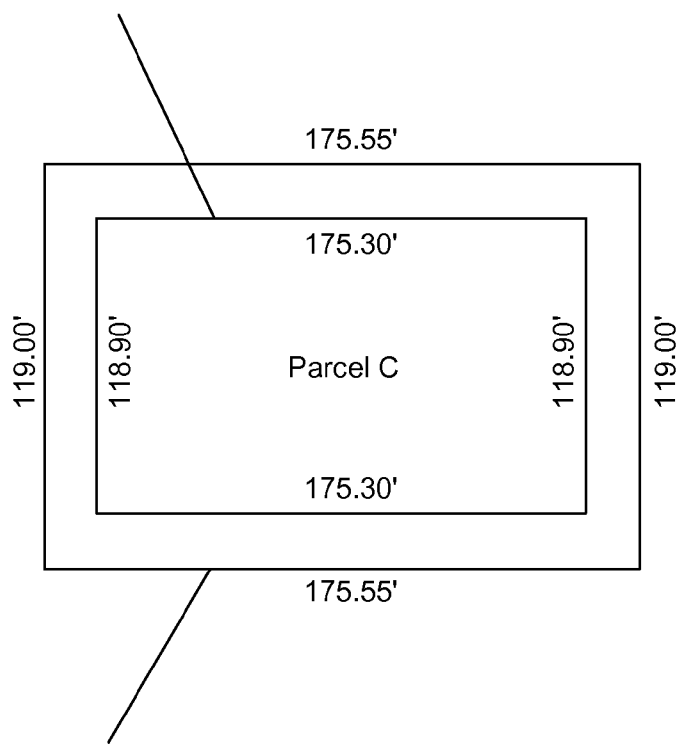
FIG. 4 is a depiction of the dimensions of a parcel of land on both a State Plane Coordinate grid system and as measured on the ground per a legal description.
Figure 5:
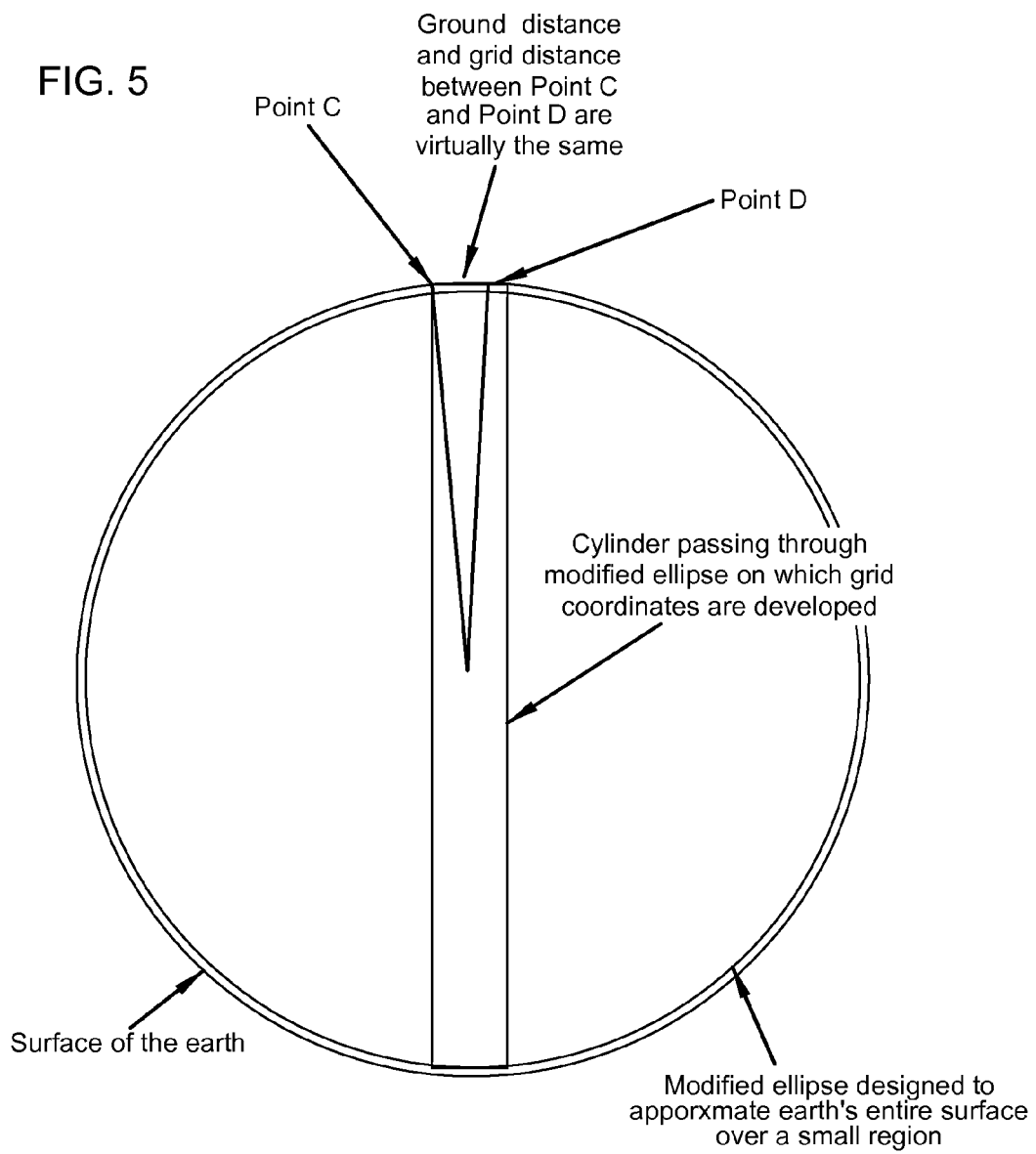
FIG. 5 is an illustration of a County Coordinate System map projection.

All states within the Unites States have official State Plane Coordinate (SPC) systems which are grid coordinate systems generated by map projections designed to encompass one or more regions or zones within a state. Because of the large size of the areas encompassed by SPC systems, the distances between points as measured on the ground are shorter or longer in comparison to distances given in the grid systems. In the state of Wisconsin for example, the difference between ground distance and SPC grid distance can be as high as 1.0 feet over a distance of one mile. The difference between ground and grid distance increases as the separation of two points increases (See FIGS. 3 and 4). Spatially relating legal descriptions and plats of survey using SPC grid systems may introduce an unacceptable amount of distortion in distances derived from computed grid coordinates and actual ground distances measured. This is due to the SPC system being optimized to fit the state as a whole, where there may be distinct land forms and other geographic features. As the SPC system has to average all of these statewide distortions, in any given location within the state, the difference between grid and ground distances may be unacceptable.

The Wisconsin Department of Transportation has developed the Wisconsin County Coordinate System that defines a local map projection for each county in the state of Wisconsin. These grid systems are based on map projections that are designed to encompass and be optimized for no more than one county. As a result, the difference between county coordinate grid distances and ground distances in many counties, and over areas spanning several miles, is insignificant compared to the errors of measurement associated with the best practices of land surveying. The Wisconsin County Coordinate System may therefore be a suitable grid system in some areas for the transformation of GPS derived latitudes and longitudes into map projected coordinates for the purpose of spatially relating unconnected surveys.

Survey crews using electronic total stations and GPS may perform field measurements and computations for a property survey and then utilize a local Cartesian coordinate system appropriate for or specified for the deed or legal description for that property. In carrying out the survey in the field, the points to be surveyed may be determined and marked, as noted above. A GPS base station is allowed to run for several hours during the survey at a base point within the parcel or parcels to be surveyed, while a GPS rover occupies and makes observations at the marked points and any other points of interest in the survey area. As an alternative to use of a GPS rover to visit all of the points of interest within the survey, more traditional traversing may be carried out to locate points within the survey area. For example, such traversing could be carried out through the use of a total station, provided these traverses are tied to at least two of the points included in the GPS survey. For example, the traverse could extend between the point occupied by the base station and some other point in the survey. Data collected by the total station and GPS receivers may then be downloaded into computers at the office. The data collected during the survey is in the form of measurements related to a local assumed Cartesian coordinate system which is based on location information of the recorded plat or legal description. This data is on a local system and is used to draft the plat of survey.

GPS data from one or more CORS stations is downloaded from the Internet into GPS office software, along with precise satellite orbital data. This CORS data and orbital data are post-processed in order to derive vectors from the CORS stations to the base station at the site of the survey. Once vectors from the referenced CORS control points are derived, adjustment computations may be used to calculate high accuracy coordinates within the NSRS for the base station within the current survey area. A GPS vector for at least one other point within the current survey area must also be derived, using relative vectors measured from the base station to the desired additional point(s).

Latitudes and longitudes within the NSRS may then be transformed into Wisconsin County Coordinates which may be stored within a point database or some other form of digital memory for use in later calculations. Data or field notes relating to any traverses that were performed using more traditional surveying methods and which were tied to GPS points can also be used to compute County Coordinates for any non-GPS points included in the traverse.

In the adjustment computation, coordinates of the CORS stations may be held fixed in a least squares adjustment, as these coordinates are verified and calculated to a very high level of absolute accuracy. Holding these point coordinates as fixed in the adjustment computation will thereby improve the accuracy of the NSRS coordinates calculated for the base points within the current survey area and will permit the generation of probable Easting and Northing errors, or a resulting error ellipse, for the location of the base station.

As an alternative to using post processed GPS vectors from CORS stations to the site of the survey, a VRS may be used. In this case there may not be a base station at the site of the survey. If VRS is used exclusively then the rover must take measurements on at least two points on the survey.

Figure 2:
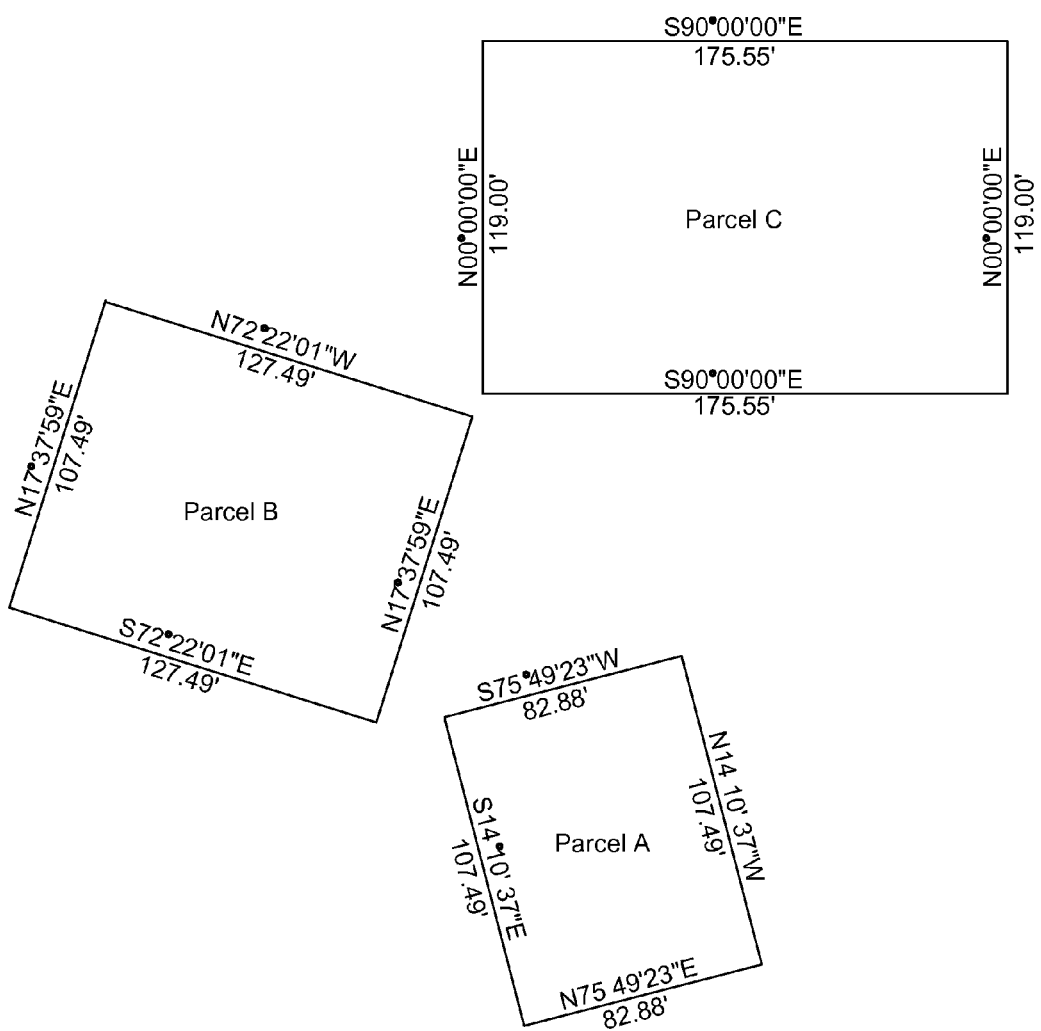
FIG. 2 is a depiction of the same four parcels of land with bearings and distances from deed or legal descriptions.

The same procedures may used for a second survey of a contiguous, overlapping, adjacent or nearby unconnected survey. This is shown in FIG. 2. As shown in FIG. 1, the actual layout of the parcels on the ground has the parcels arranged in a particular orientation. When each parcel is surveyed using its internal coordinate system, (as indicated by the bearings included with each of the measured boundaries), the parcels wind up oriented as shown in FIG. 2, even though these surveys may be performed to the same level of internal accuracy in the measurement and adjustment of the relative locations of the points within each survey.

The net result of the preceding process may be two point databases or more broadly two sets of points from two distinct surveying jobs which may be in two different coordinate systems.

It should be noted that for the purposes of this approach to coordinating surveyed points in different coordinate systems, it is assumed that each of the surveys involved include an acceptable level of internal integrity. In other words, the angles turned and distances measured (assuming a theodolite was used), or the relative GPS positioning between points of the survey are all of high enough accuracy and have been adjusted as necessary to apportion or eliminate systematic or random errors according to normal surveying adjustment computations. Once the internal integrity of these surveys has been established and coordinates in some required or chosen coordinate system have been computed, the approach disclosed in the present disclosure may be used to bring points portrayed in different coordinate systems to a common geographic base.

Because the internal integrity of each survey is presumed to be of an acceptable level, it is desirable that the geometry of each survey be held fixed during the relating of the different surveys to a common coordinate base. In the example shown in FIGS. 1 and 2, it should be noted that each of the surveys in FIG. 2 have acceptable internal geometry. Note that the rightmost boundary of Parcel B and the rightmost boundary of Parcel C are actually parallel as they exist on the ground (as shown in FIG. 1) while they are depicted as differing in bearing by over seventeen degrees in FIG. 2. In this example, all three of the surveys depicted are internally accurate but projected into distinct coordinate systems, where collinear or parallel sides do not appear to line up with each other. While this is exaggerated for the purposes of this example, it serves to illustrate that although each survey might be internally geometrically acceptable, its external geometry might not be acceptable.

One conventional approach to bringing these two surveys together would require that all of the points in one or both surveys be readjusted. Such a conventional approach might include a comprehensive least squares or other similar readjustment approach, which might allow all of the points to be readjusted without any regard for the original geometry of the surveys. However, since it is desirable to hold the internal geometry of each survey fixed through the computations, only translations and rotations of the constellation of points as a group are performed, according to the present invention. To accomplish this translation and rotation, at least two points are required.

Figure 7:
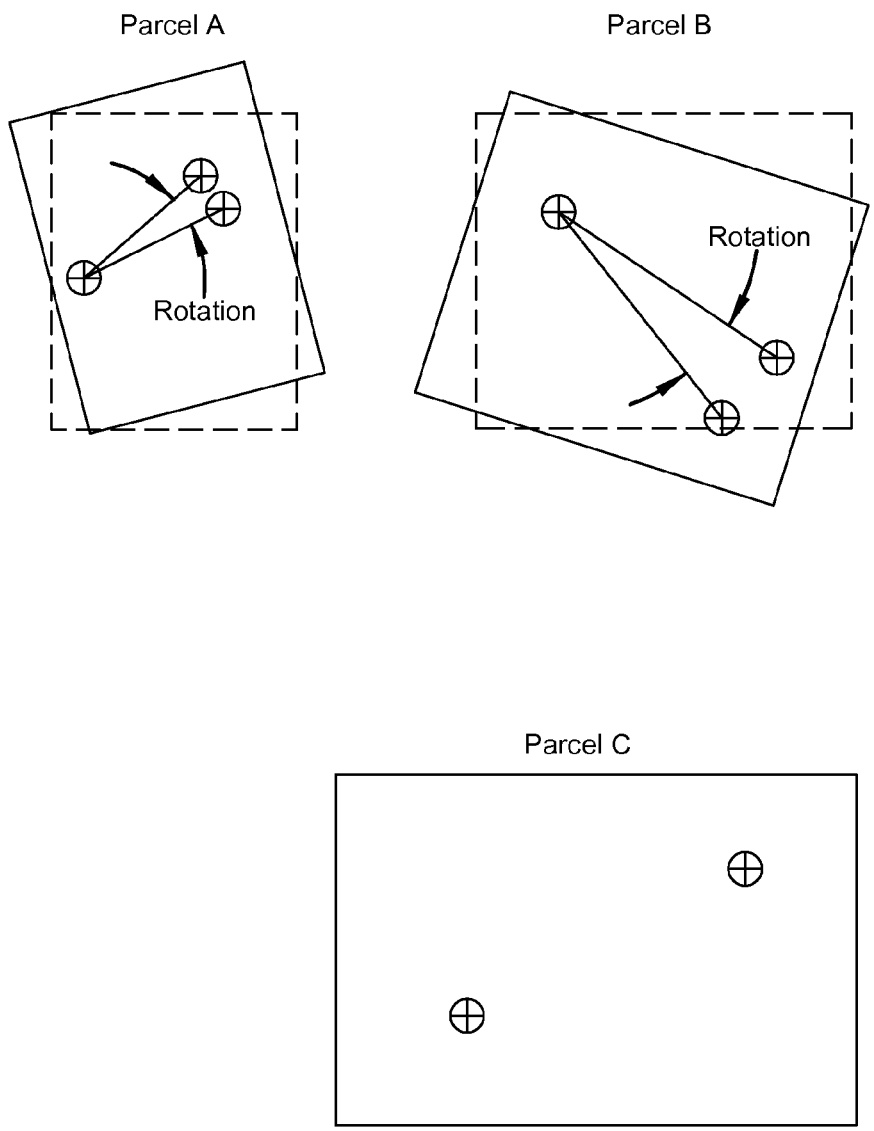
FIG. 7 illustrates the transformation of drawing entities and associated point databases from deed or legal description-based coordinate systems to a single local grid system.

In general terms, two or more points from each survey will be used to accomplish any required or desired rotation and translation of that survey, while bringing each survey to a common geographic base or projection. While the translation and rotation may be referred to as being applied to the survey as a whole, the rotation and translation of each survey are actually carried out by computing new coordinates for each of the points defining endpoints or intermediate vertices of line segments within each survey. Such a translation and rotation of a survey may also include the computation of points related to the survey but which are not associated with or part of a boundary line, such as geographic or manmade features measured in the field and/or located on the survey plat. Each survey can be rotated as necessary to bring the geometries of each survey into alignment, as shown in FIG. 7. A general approach to accomplishing this translation and rotation of the different surveys is described below as an example of one embodiment of the present invention. The description of the preferred embodiment below in not intended to limit the scope or nature of the present invention and is provided as an illustrative example only.

In FIGS. 8 to 13, illustrations of the portions of the preferred embodiment are provided. The preferred embodiment described below illustrates how each survey is processed from field data collection to preparation for transformation to a local grid coordinate system in conjunction with another survey. While the transformation of coordinates into a local grid coordinate system for a single survey may be carried out independently of any other survey, typically, two or more surveys which are adjacent or nearby to each other will be processed at generally the same time or simultaneously.

FIGS. 8A and 8B illustrate two representations of a survey of a parcel 100, with FIG. 8A showing a total station 10 being used to traverse the parcel or measure distances and angles between points and lines defining a boundary of the parcel. FIG. 8B shows a first GPS receiver 12 ("A") and a second GPS receiver 14 ("B") positioned at two points or corners of the parcel that have been included in the traverse measured by total station 10.

Figure 9:
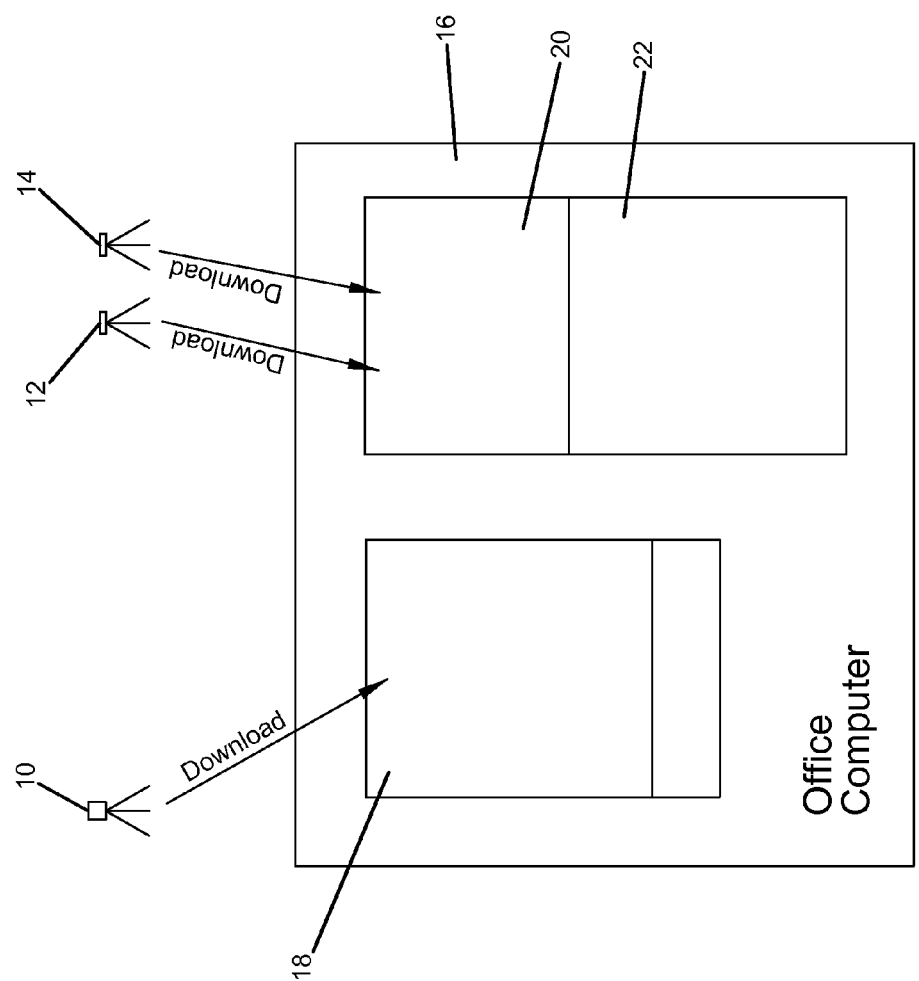
FIG. 9 illustrates the downloading of data regarding the survey from both the total station surveying instrument and the GPS receivers into an automated system for analysis.

FIG. 9 shows the data from the various surveying instruments being downloaded to an office computer 16. The environment of office computer 16 may define or be a part of a GIS. Data from total station 10 is downloaded to and processed by a computer aided drafting (CAD) software package 18 and a drawing of the parcel surveyed is compiled with an associated point database. These coordinates are computed in a local coordinate system appropriate for the particular survey. Data from GPS receivers 12 and 14 are downloaded to a GPS post processing software package 20 and an associated point database is compiled from the data. Data from the CORS stations is downloaded into the GPS post processing software and vectors are derived from the CORS stations to the base point number 1 linking point number 1 to the NSRS. A GPS vector is also derived from point number 1 to point number 4 which ties point number 4 to the NSRS. The GPS post processing software is then used to transform the latitudes and longitudes within the NSRS of point number 1 and point number 4 to the applicable county coordinates.

Figure 10A:
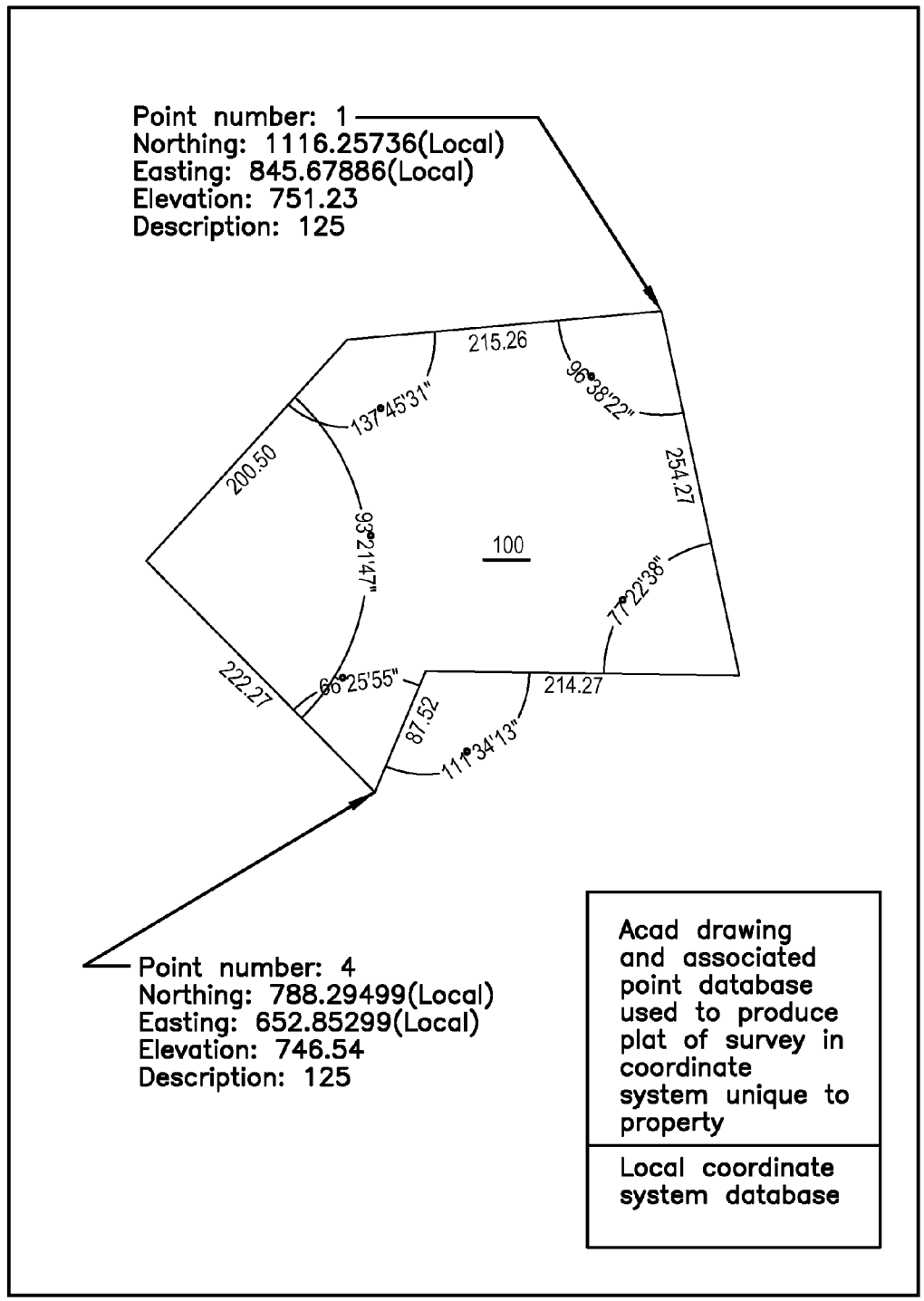
FIG. 10A illustrates the surveyed parcel of FIG. 8A with local coordinates for the GPS points shown.
Figure 10B:
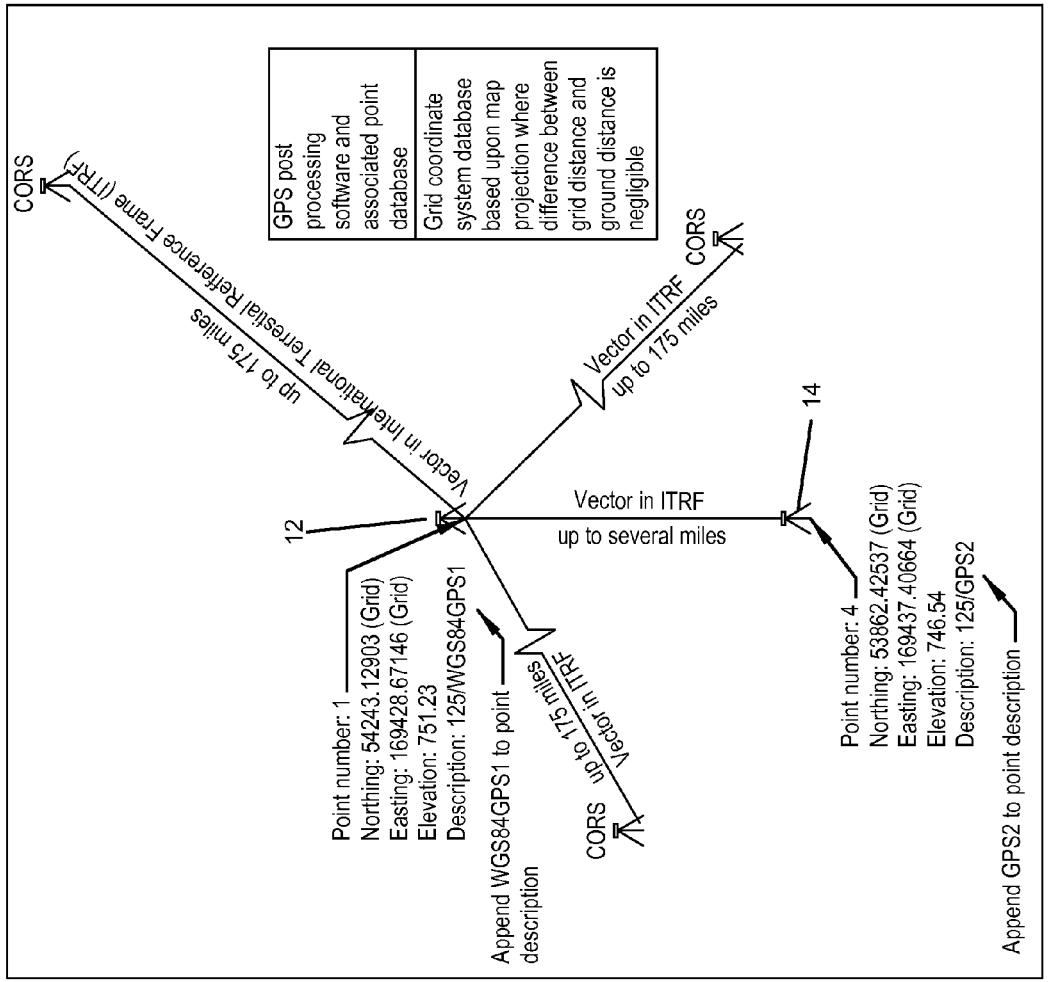
FIG. 10B illustrates the GPS points of FIG. 8B with vectors to distant known control points and one of the points shown, and a vector between the two GPS points shown.

In FIG. 10A, parcel 100 is illustrated as the CAD drawing, with all of the measured and corrected distances and angles defining the internal geometry of the parcel measured on the ground by total station 100. Note that local coordinates are computed for both of the points occupied by GPS receivers 12 and 14. In FIG. 10B, GPS receivers 12 and 14, as they were positioned at the points of parcel 100, are illustrated with measured vectors to a plurality of known CORS control points which are located outside of parcel 100. The descriptions of points 1 and 4 are modified to indicate that there are GPS derived grid coordinates for these points.

Figure 11:
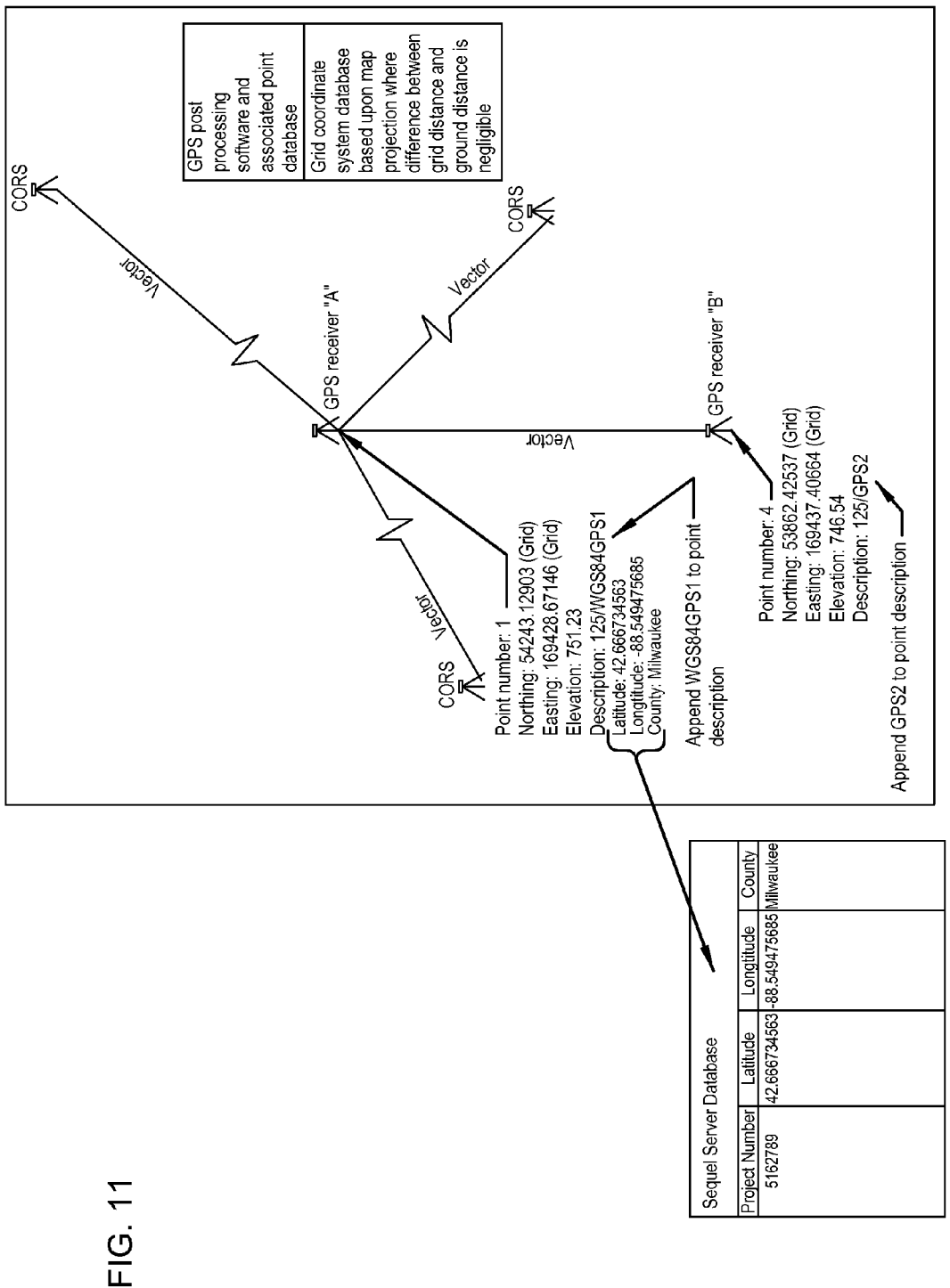
FIG. 11 illustrates a latitude and longitude computed for the GPS points of FIG. 10 from the vectors to the known control points, and a table populated with computed latitude and longitude of the first GPS point, a unique identifier and other data regarding the first GPS point.

FIG. 11 shows a table being populated with the latitude and longitude of point 1, derived from the GPS measured vectors. The lat/long of point 1 can be used to locate the survey of parcel 100 with regard to other surveys so that these surveys can be quickly located for reference in future projects or surveys and so that they can appear in their correct relative locations as points on a map in the GIS system.

The point description of a point that represents the central location of the survey in the GPS database on the County Coordinate System is modified to include the text string "WGS84" (this text string is arbitrary and other text strings or identifiers could be used; the inclusion of this text string could also be done in the field at the time of data collection). The point descriptions of two points in the GPS database County Coordinate System are modified to include respectively the text strings "GPS 1" and "GPS2" (this text string is arbitrary and the modification could also be done in the field at the time of data collection).

A project point extraction software routine is launched which is used to extract information from the GPS database on the Wisconsin County Coordinate System. This information is used to populate a project point database that contains a field related to the survey project number, a field for the latitude of the point with WGS84 in its description, a field for the longitude of the point with WGS84 in its description, and a field for the county in which the survey resides.

When a survey project number is entered into a field in the project point extraction software, the software goes out to the GPS database associated with the survey project number, it searches that database for the point with WGS84 in its description field, it then extracts from that database the latitude and longitude for the WGS84 point and the county in which the survey resides and populates the corresponding fields of the project point database with this information.

Figure 12:
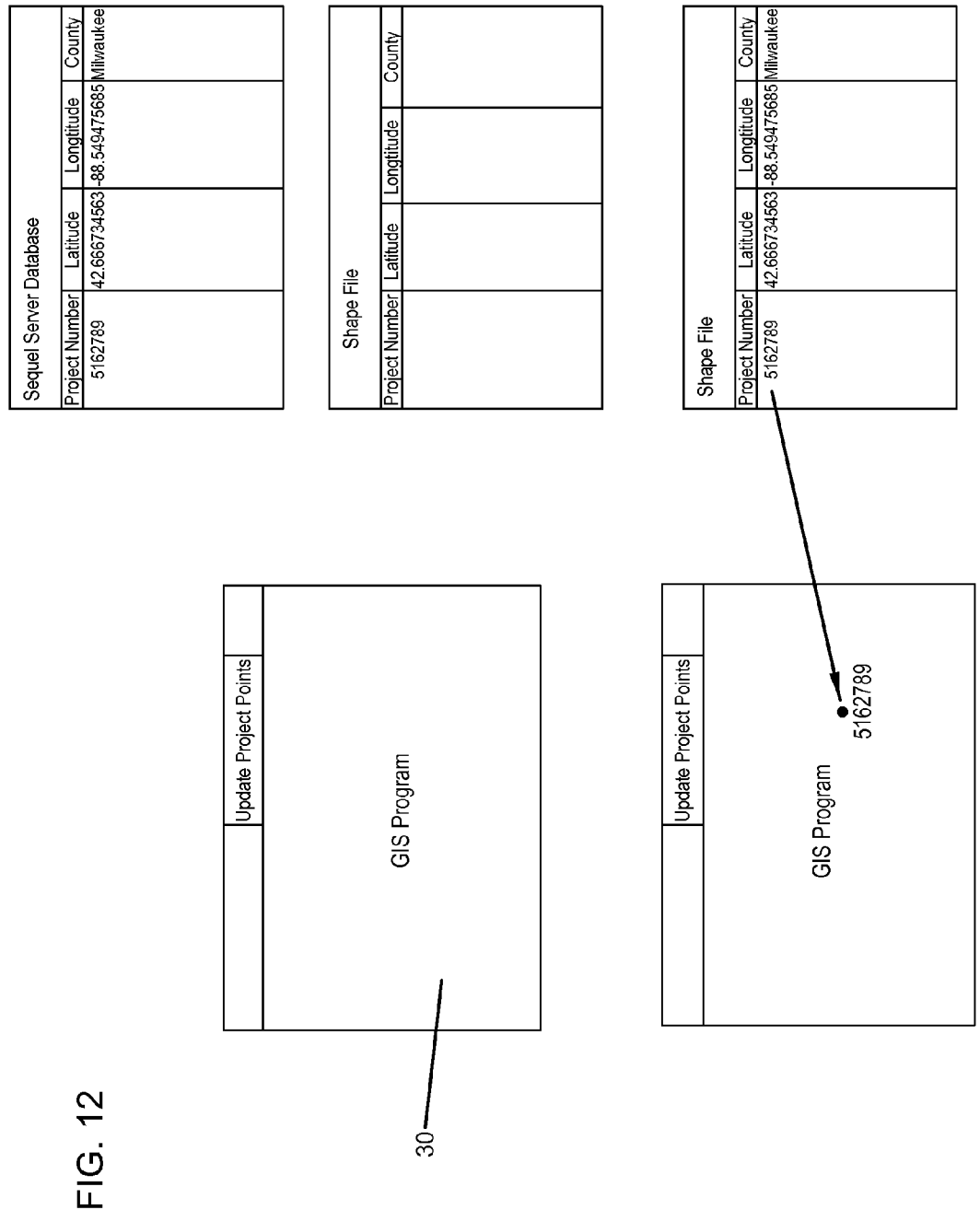
FIG. 12 illustrates a process of updating a survey project database within a geographic information system (GIS) indicating the location of the first GPS point computed in FIG. 11.
Figure 13:
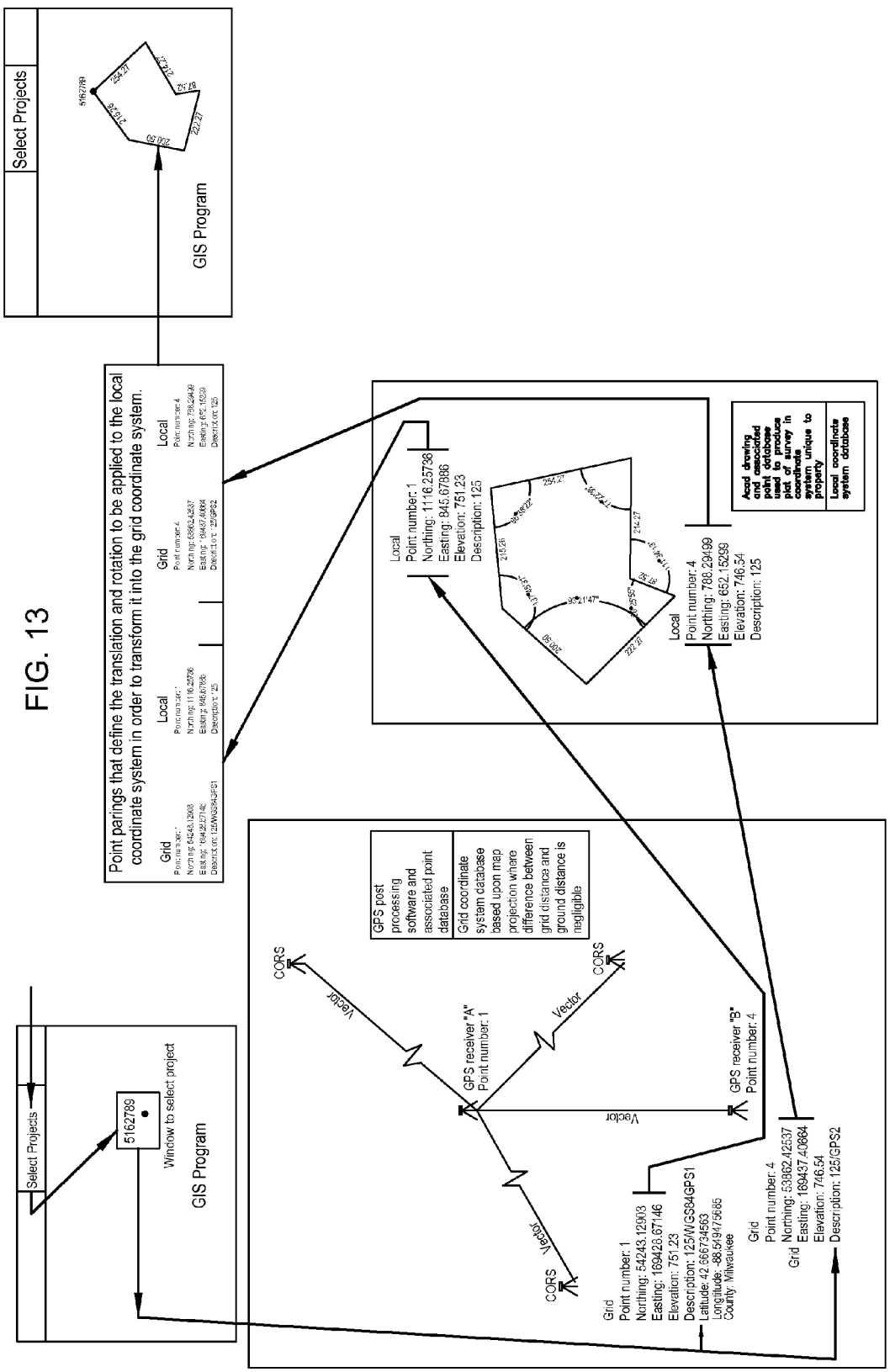
FIG. 13 illustrates a process for associating points within the survey from the total station with the GPS points, so that coordinates of the GPS points in two different coordinate systems are associated with each other.
Figure 14A:
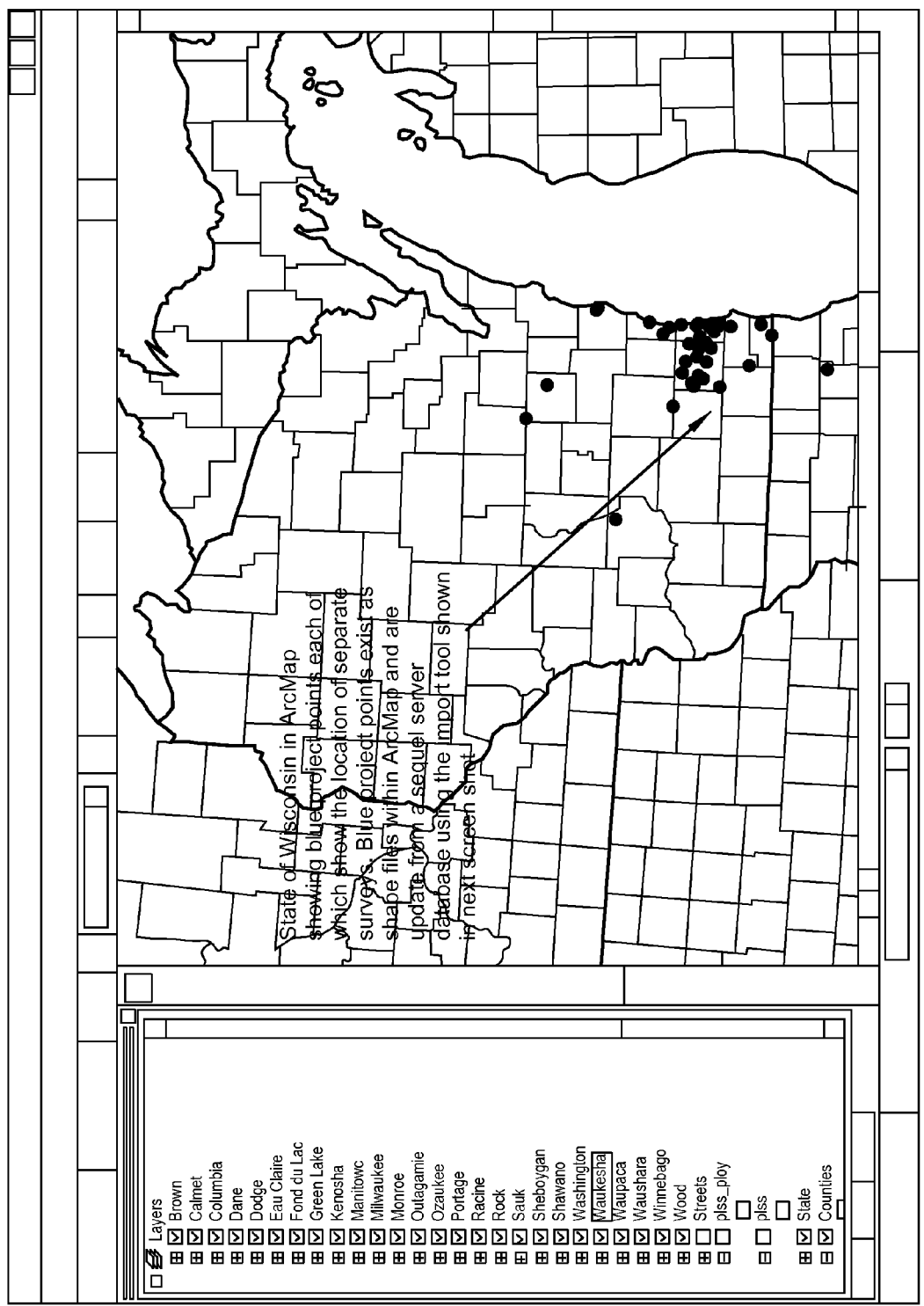
FIGS. 14A to 14W are screen shots of a preferred embodiment of the software for processing two or more surveys into a common local grid coordinate system according to the present invention.
Figure 14B:
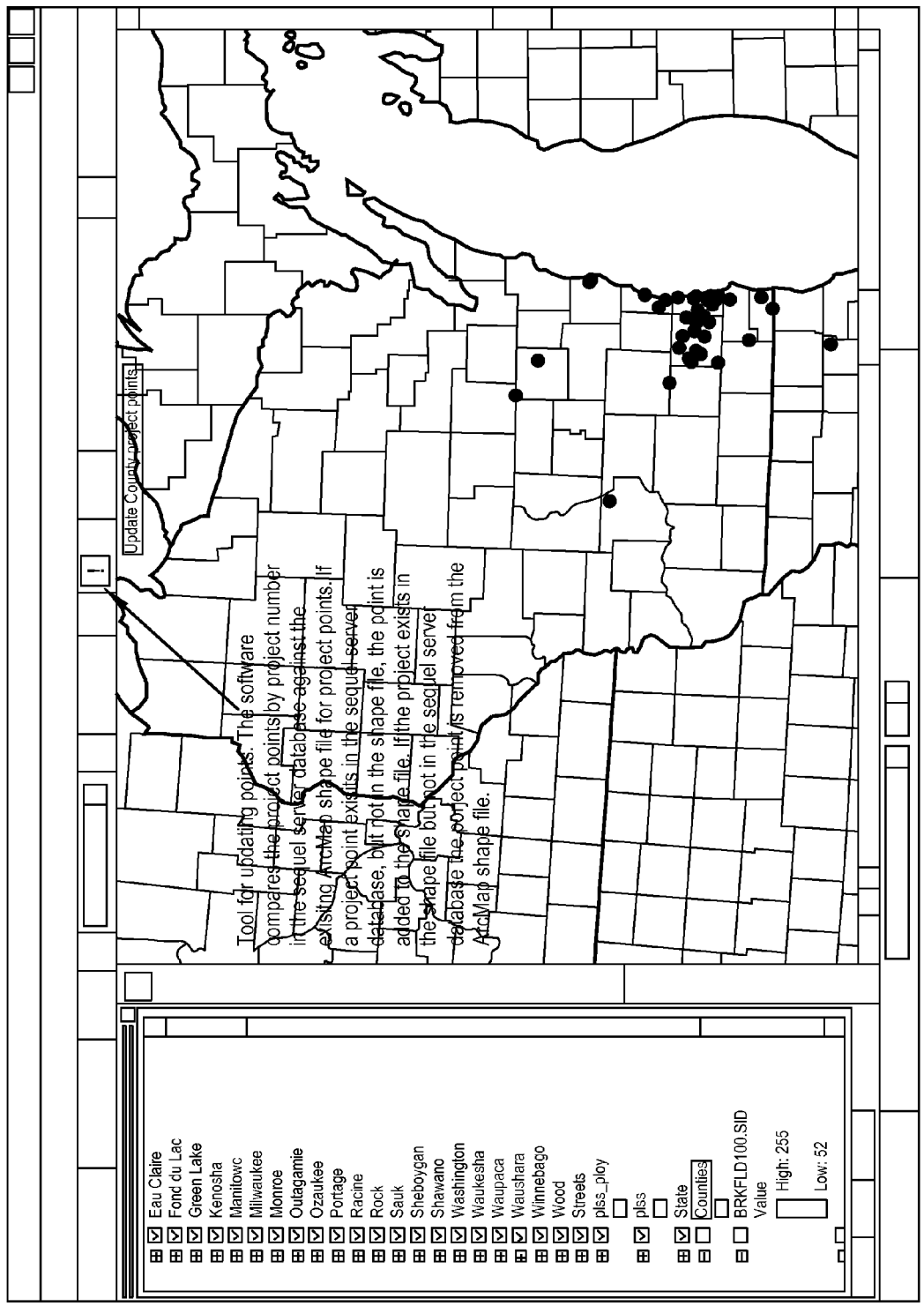
Figure 14C:
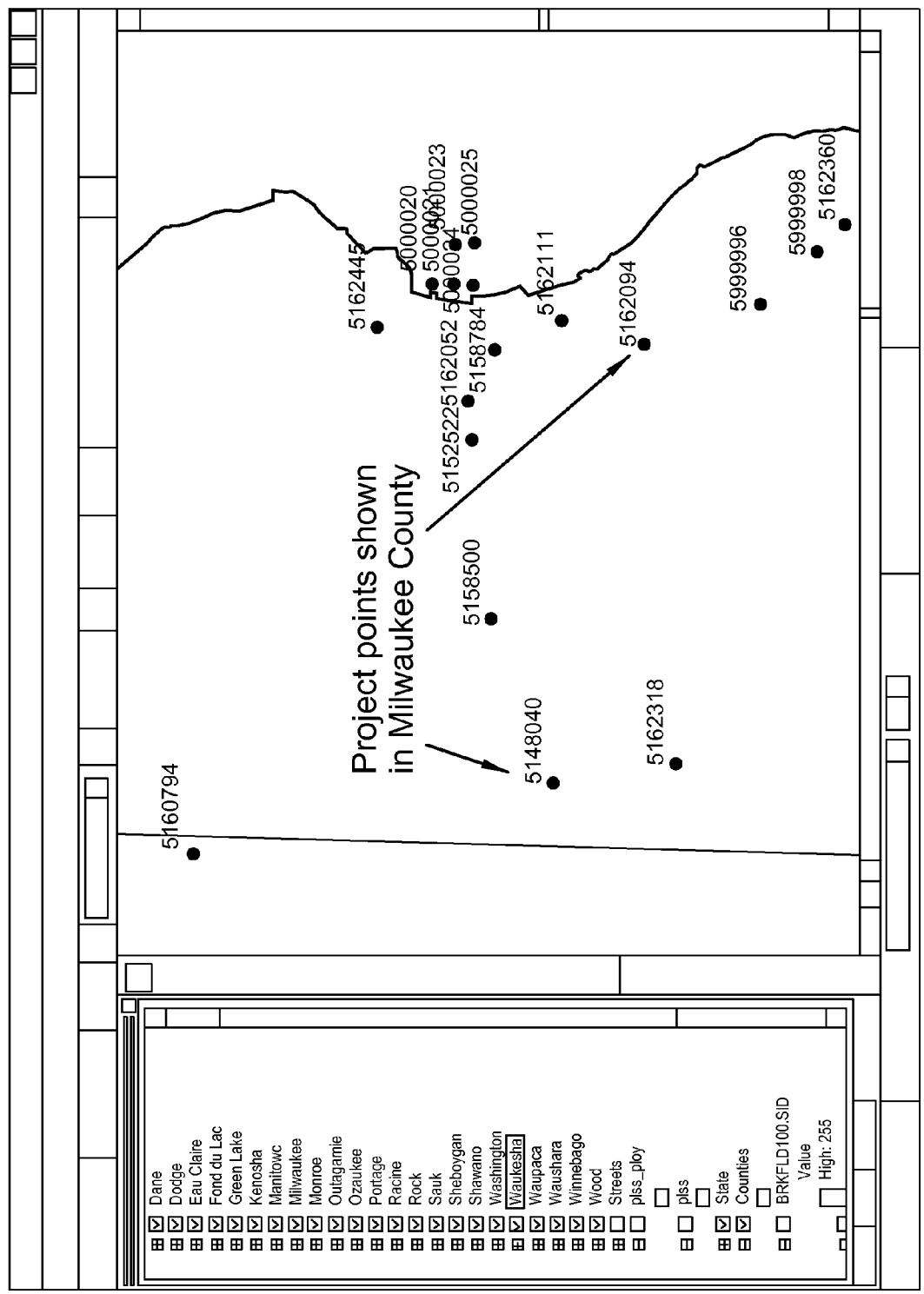
Figure 14D:
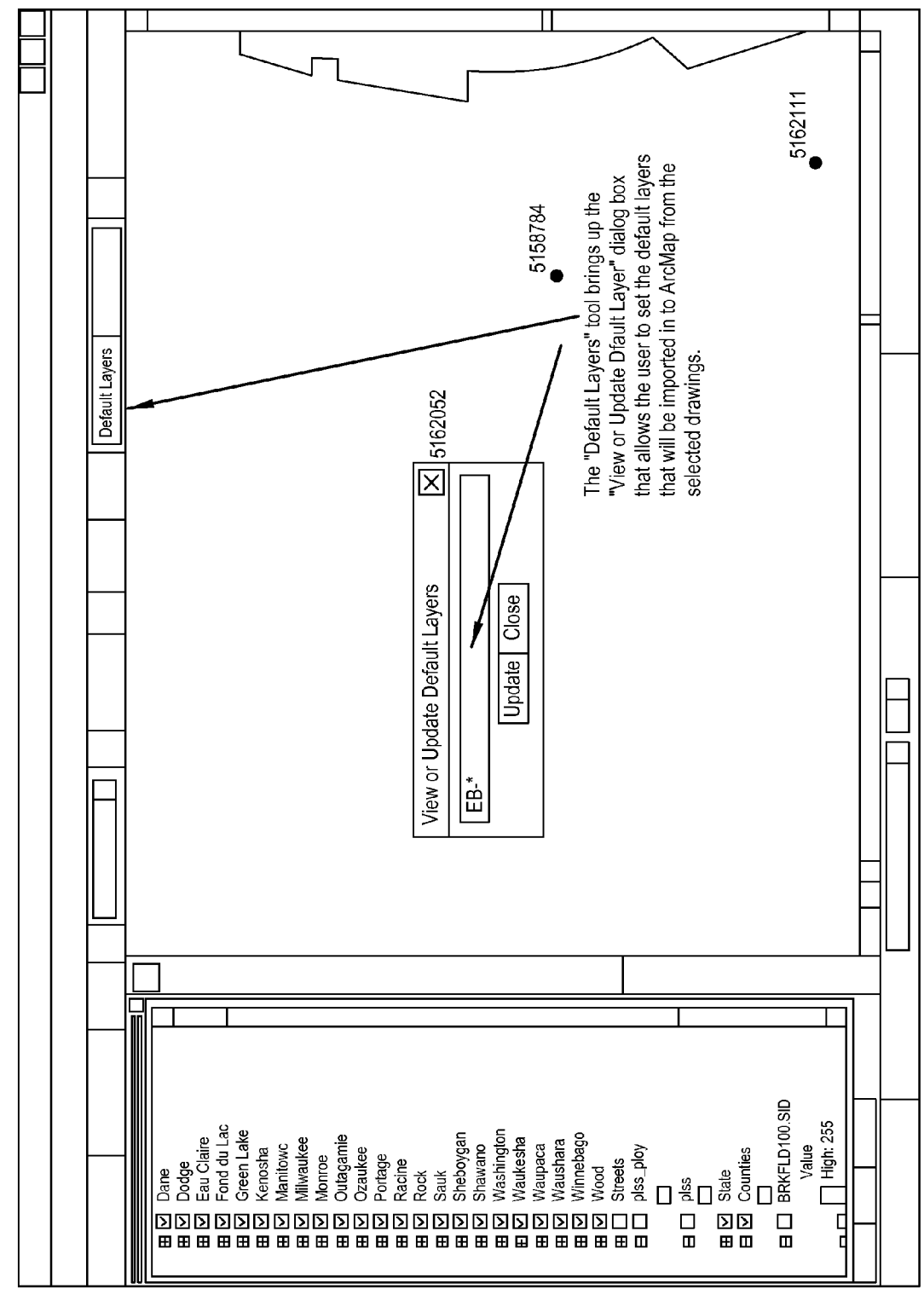
Figure 14E:
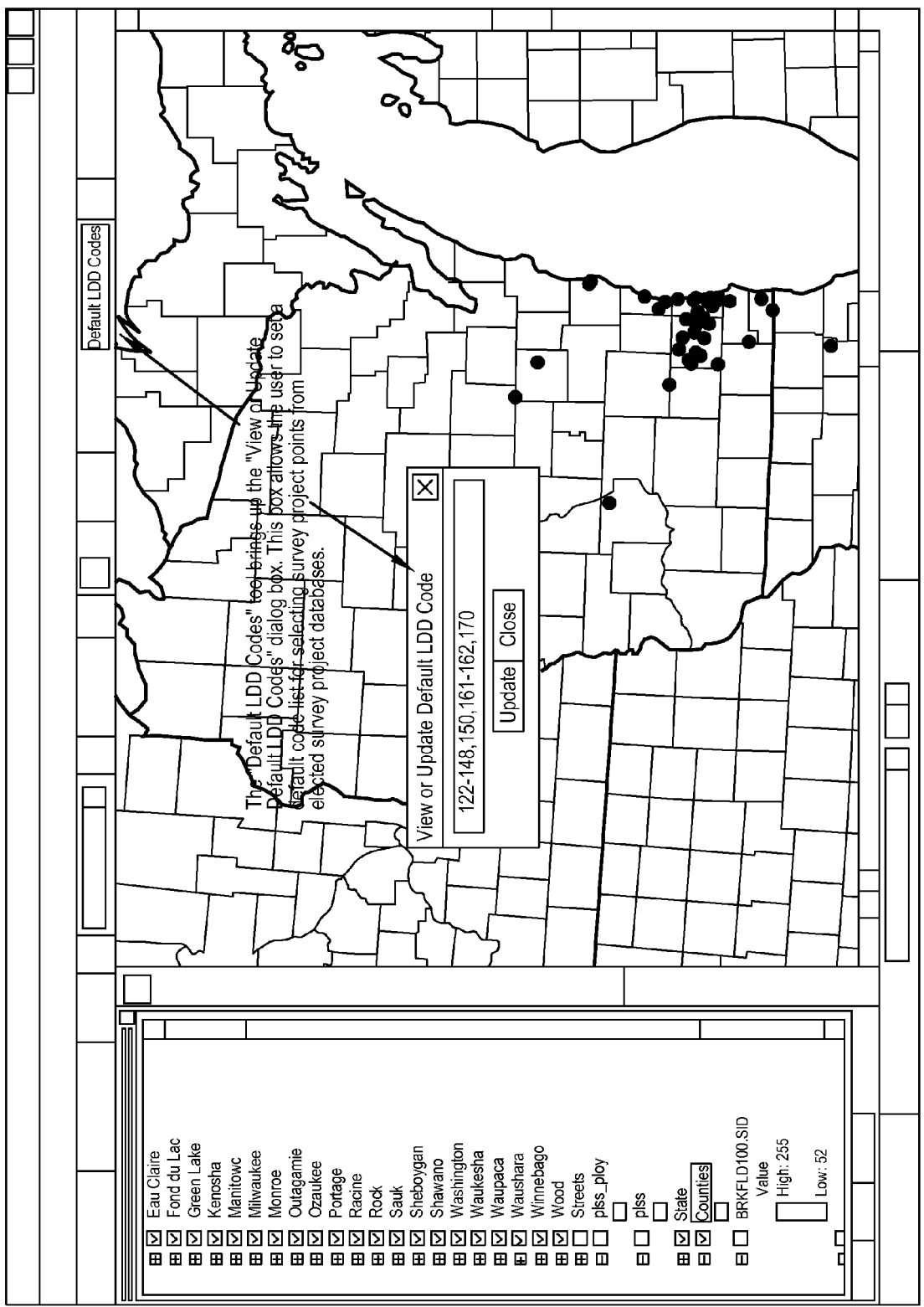
Figure 14F:
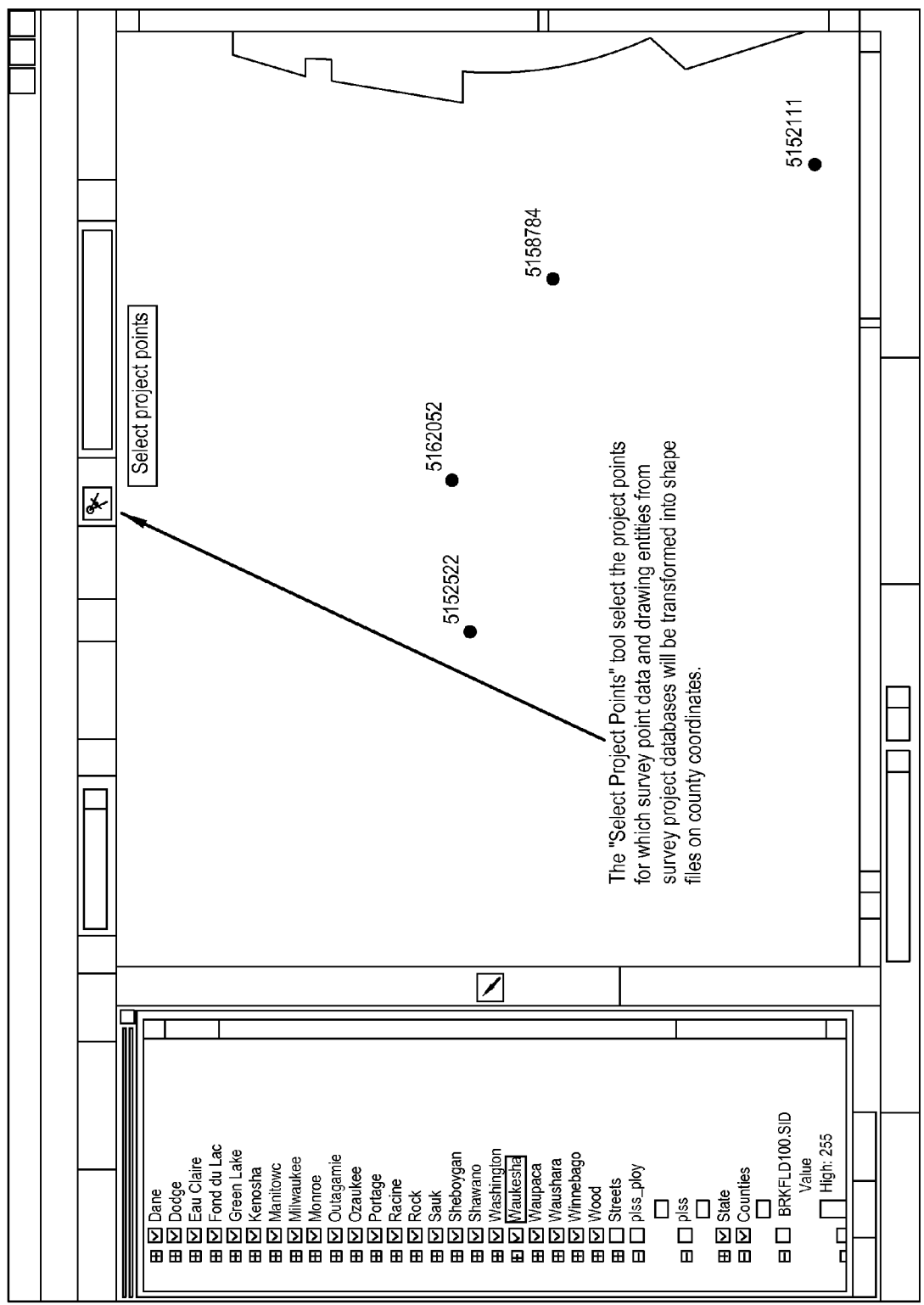
Figure 14G:
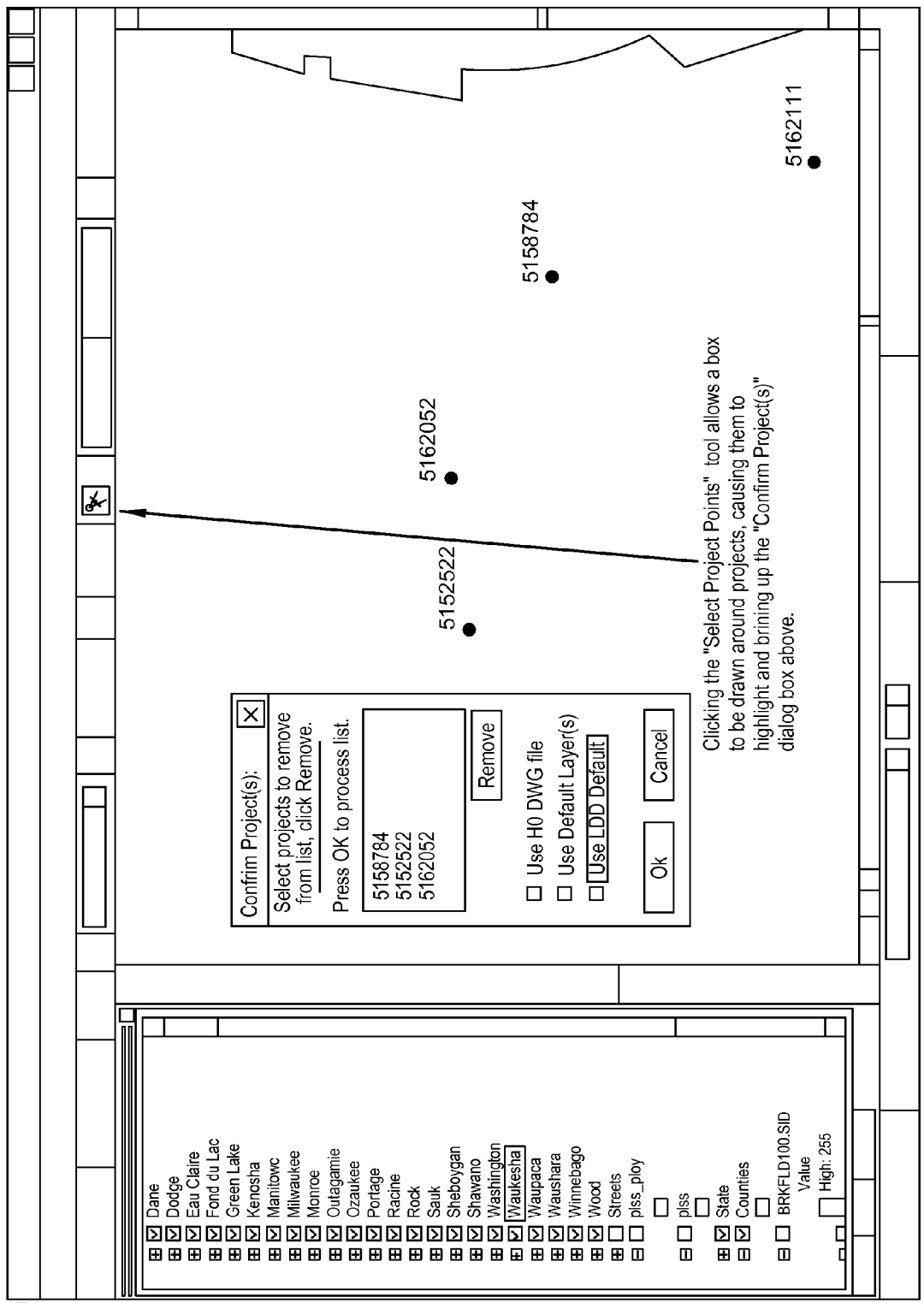
Figure 14H:
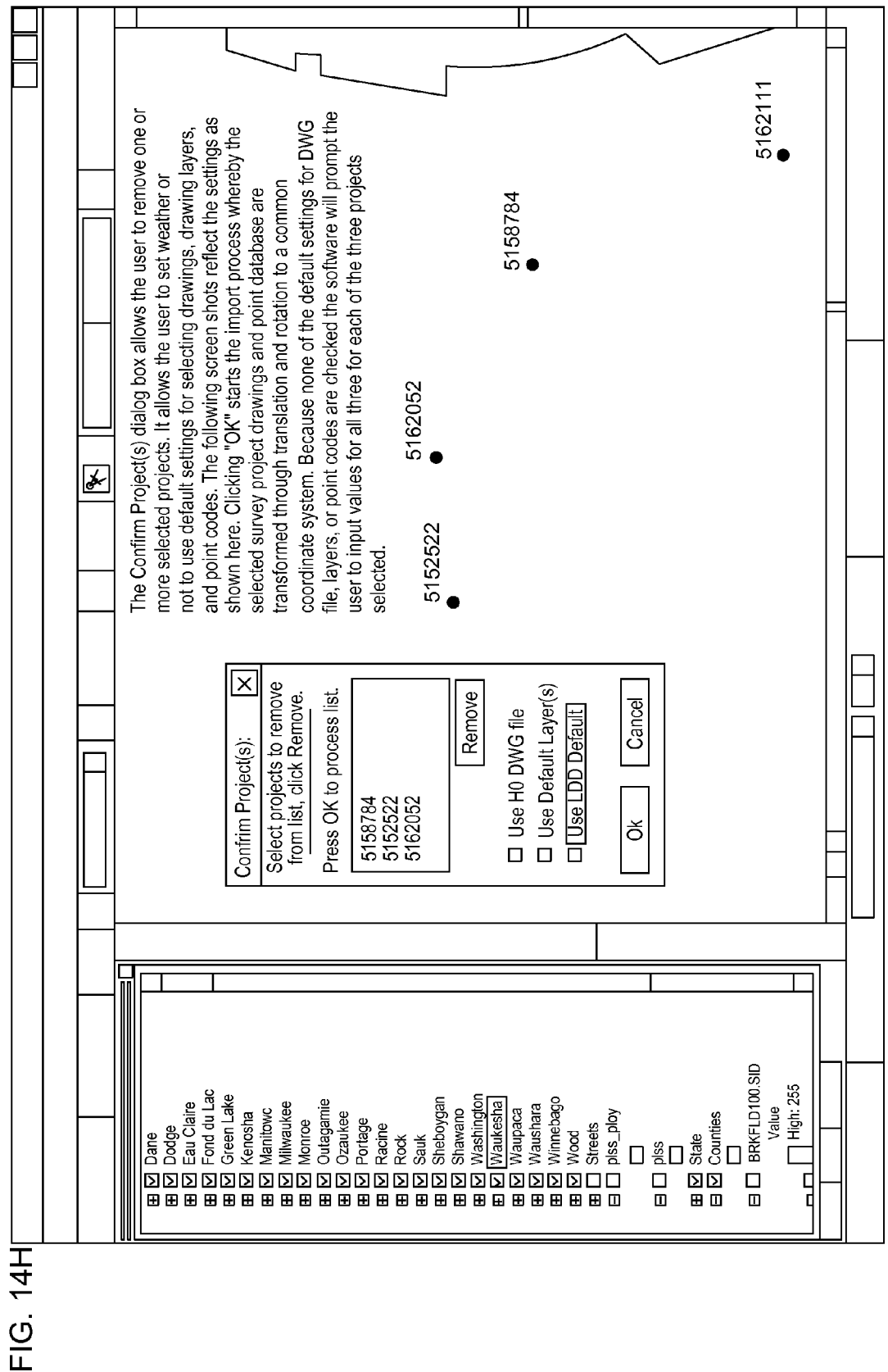
Figure 14I:
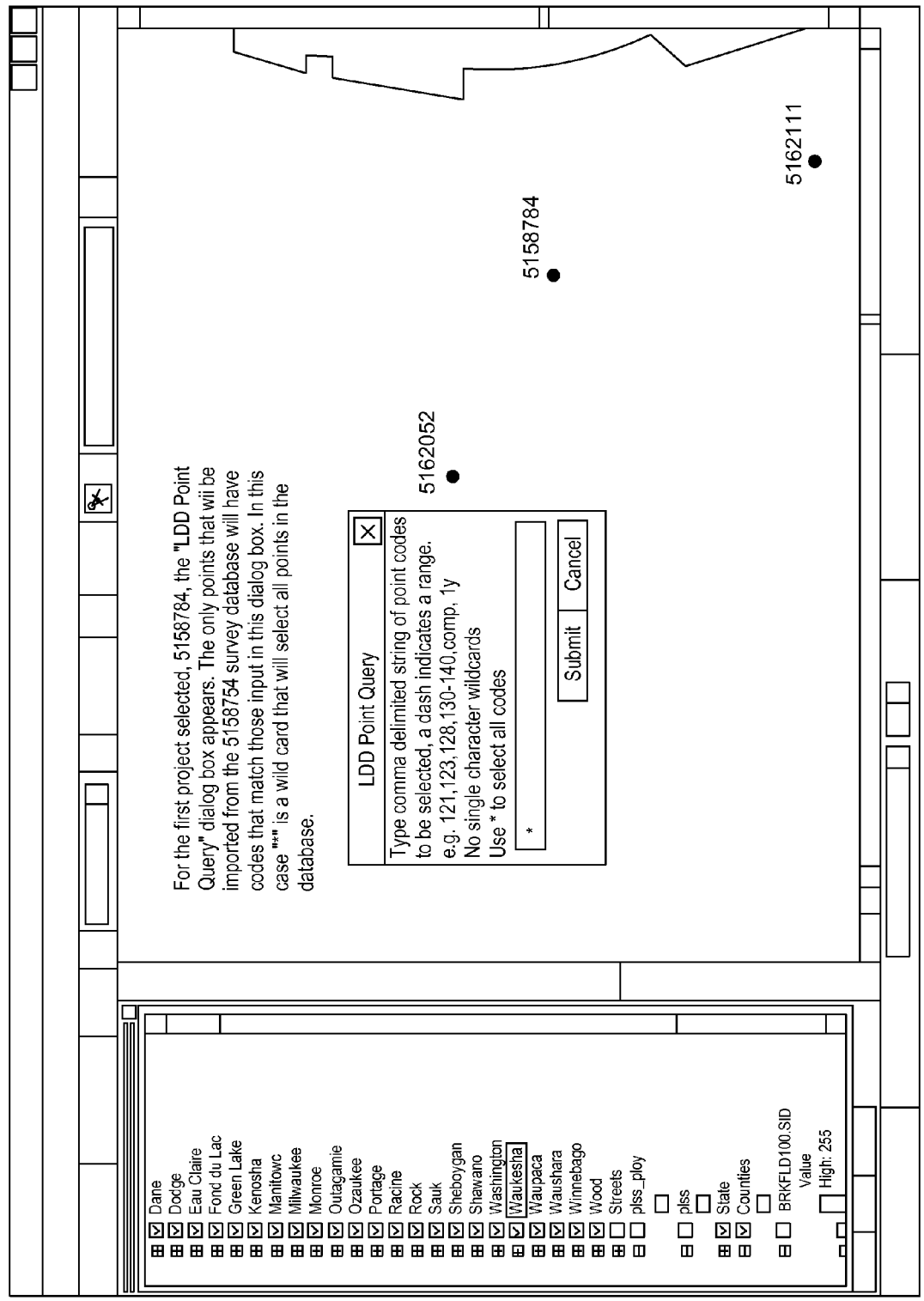
Figure 14J:
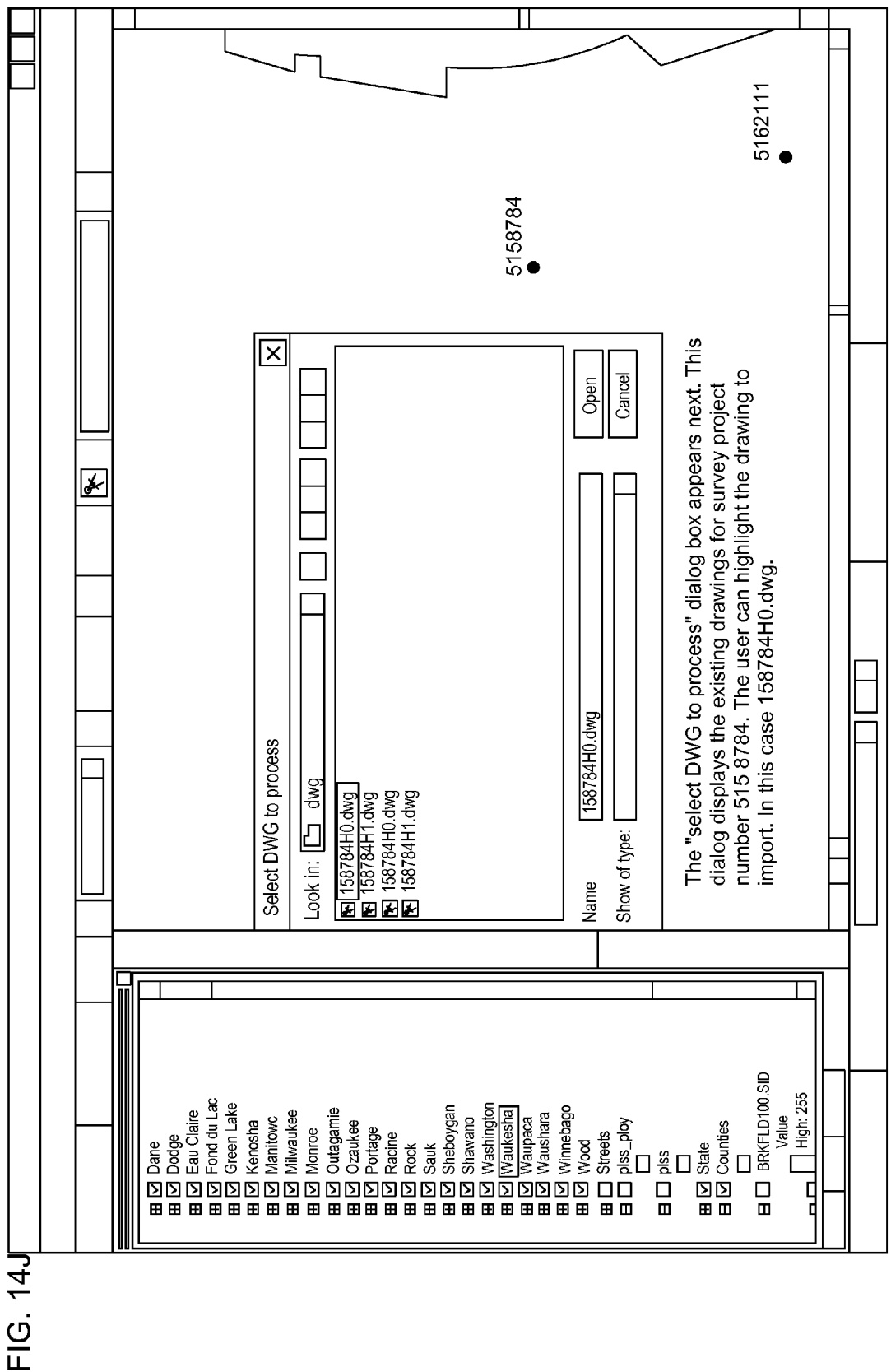
Figure 14K:
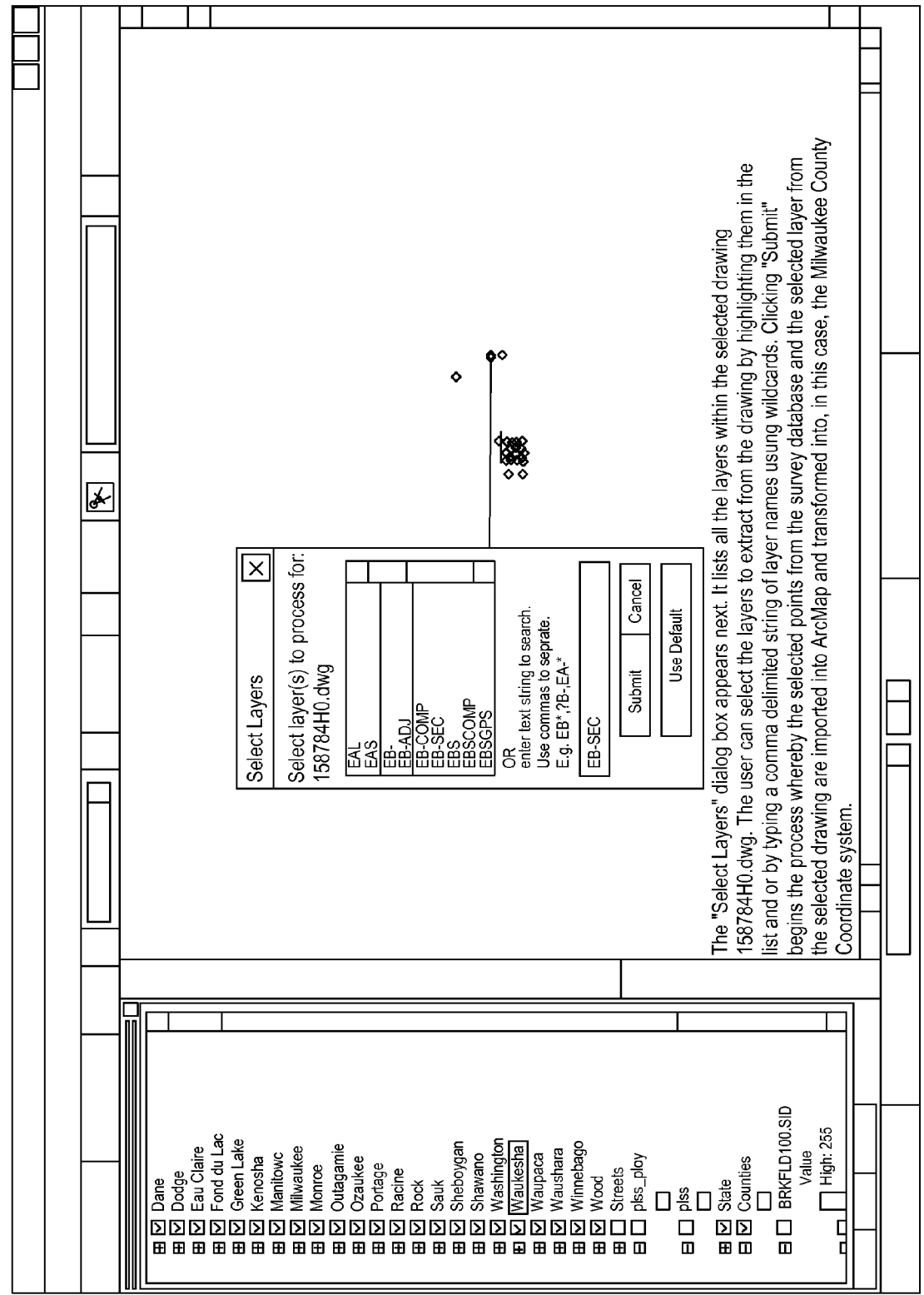
Figure 14L:
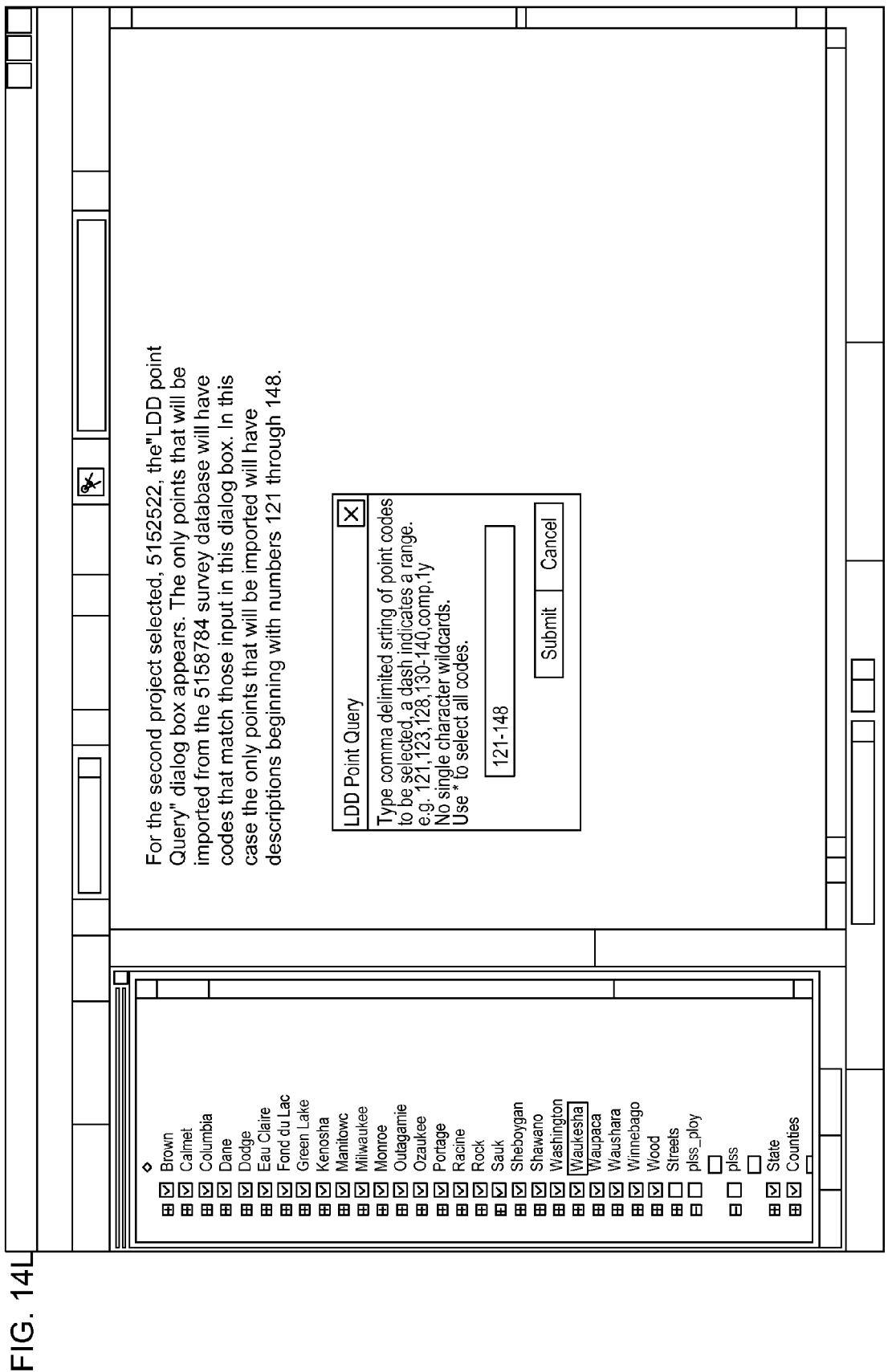
Figure 14M:
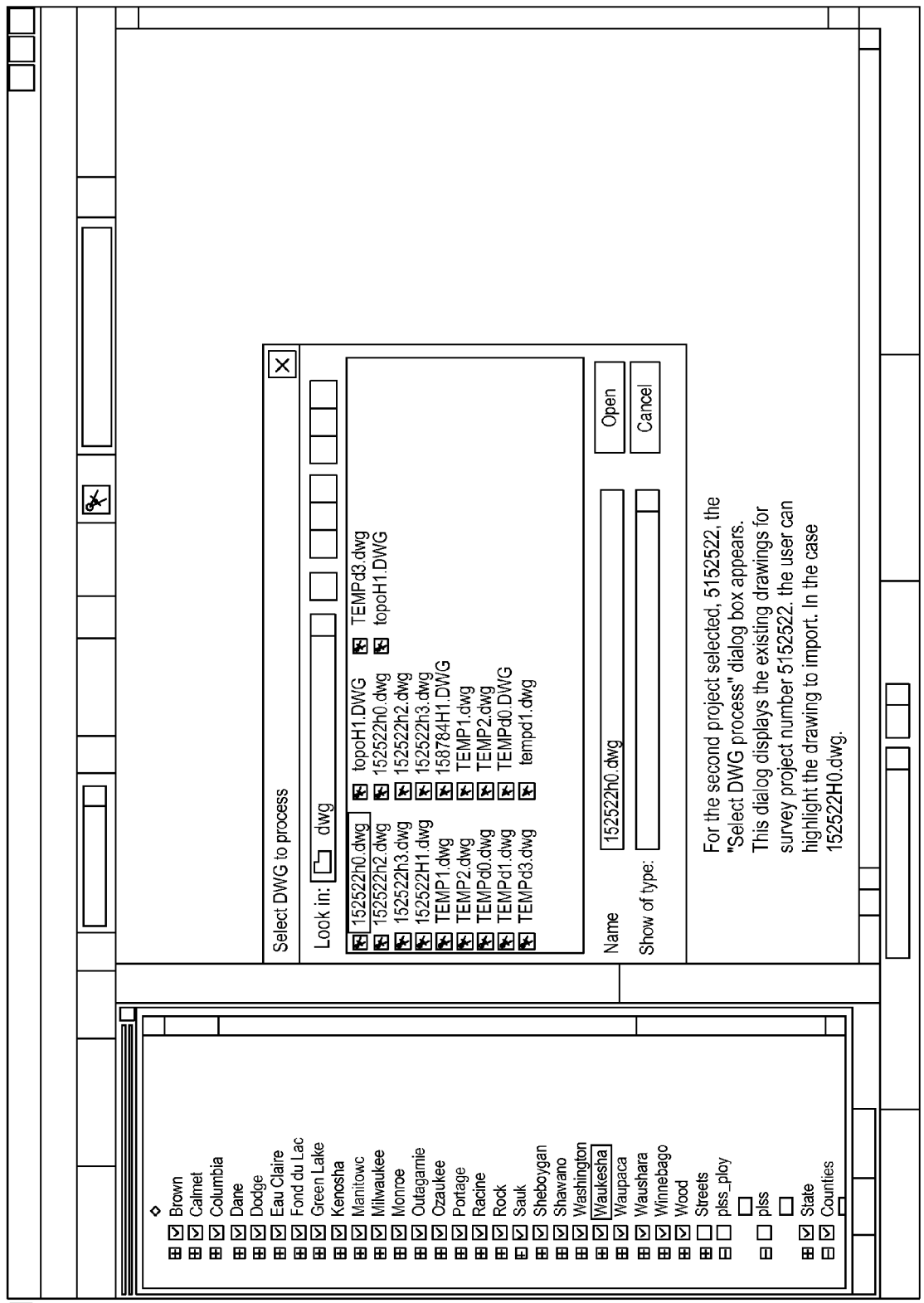
Figure 14N:
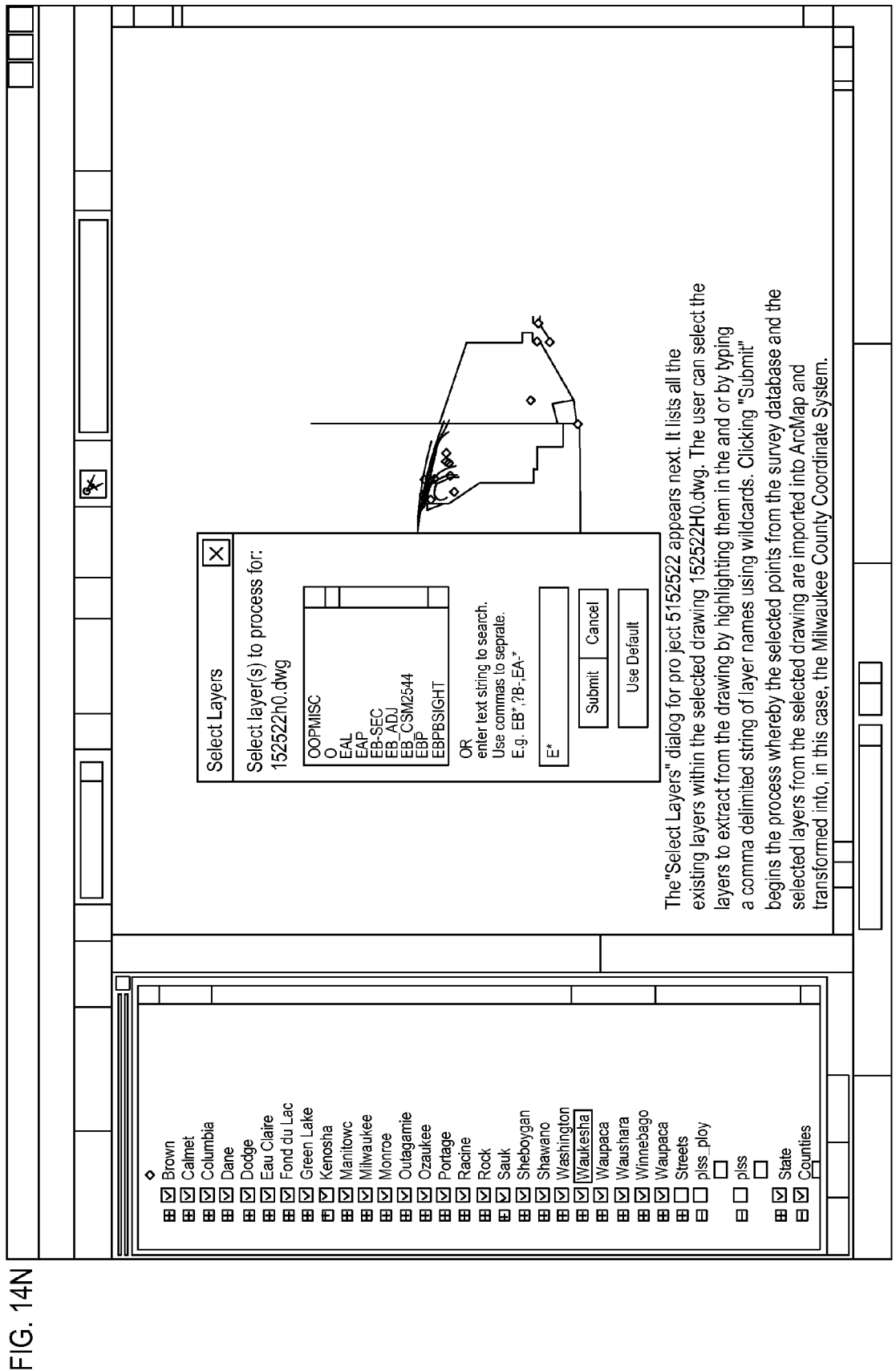
Figure 140:
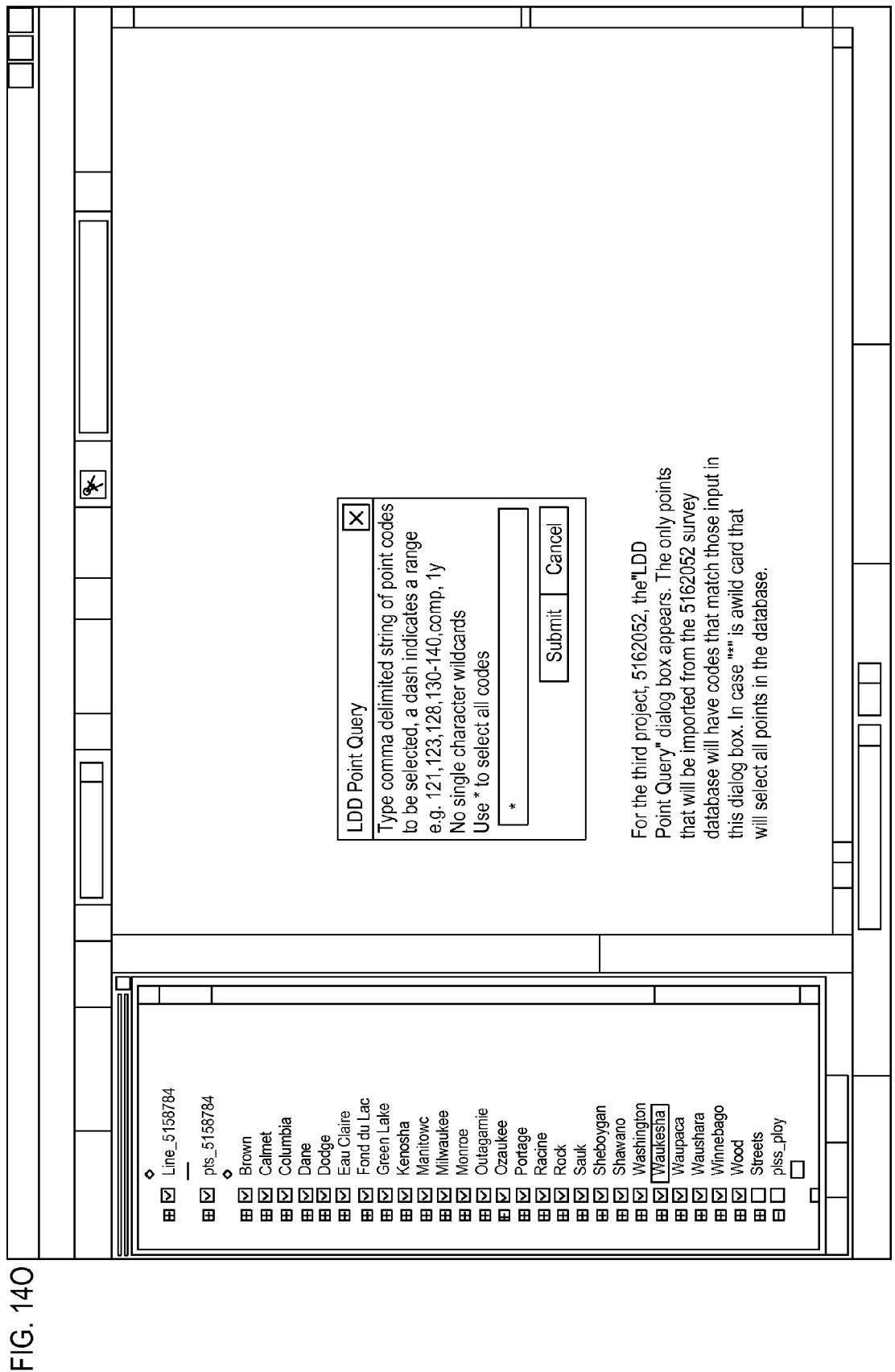
Figure 14P:
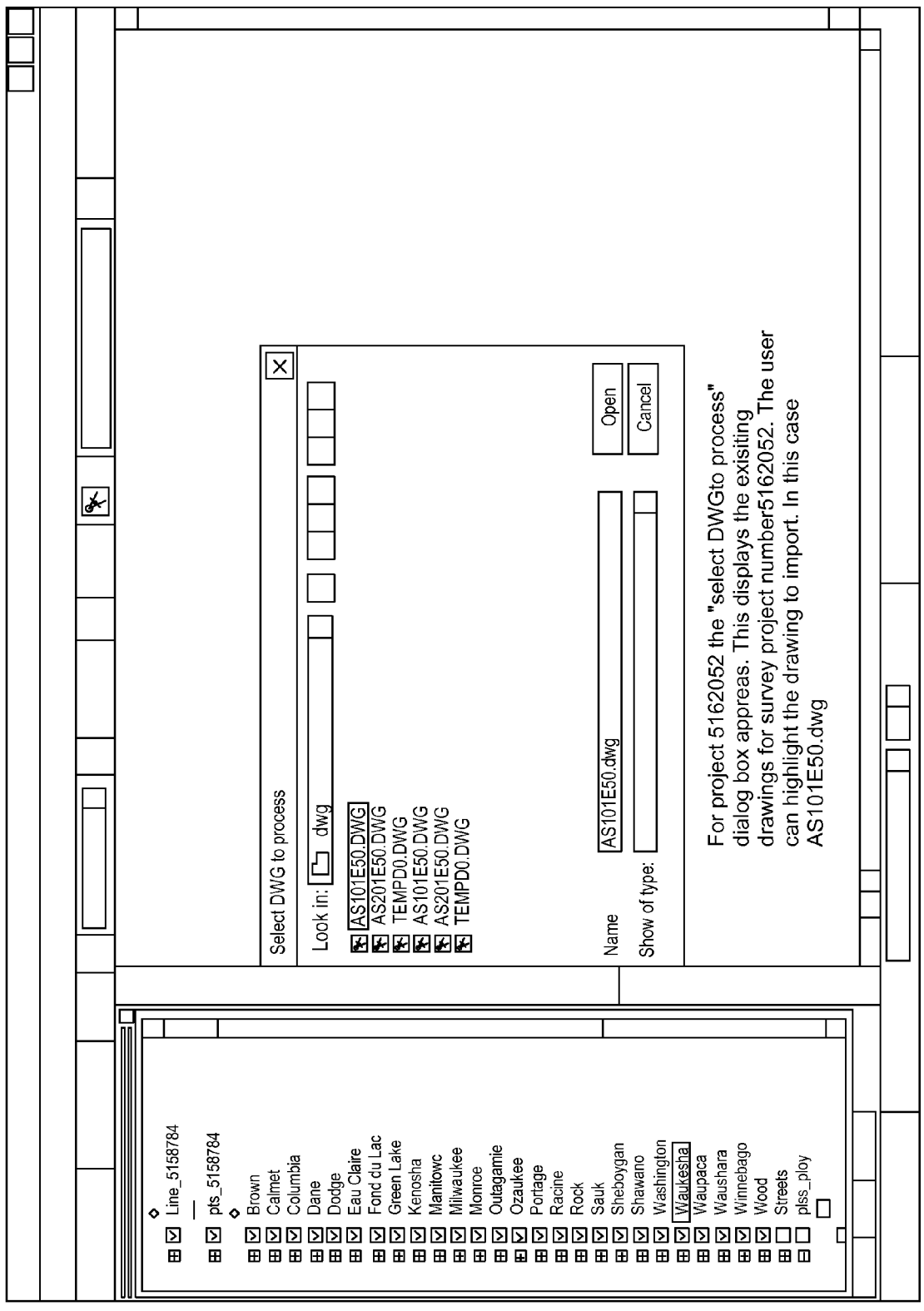
Figure 14Q:
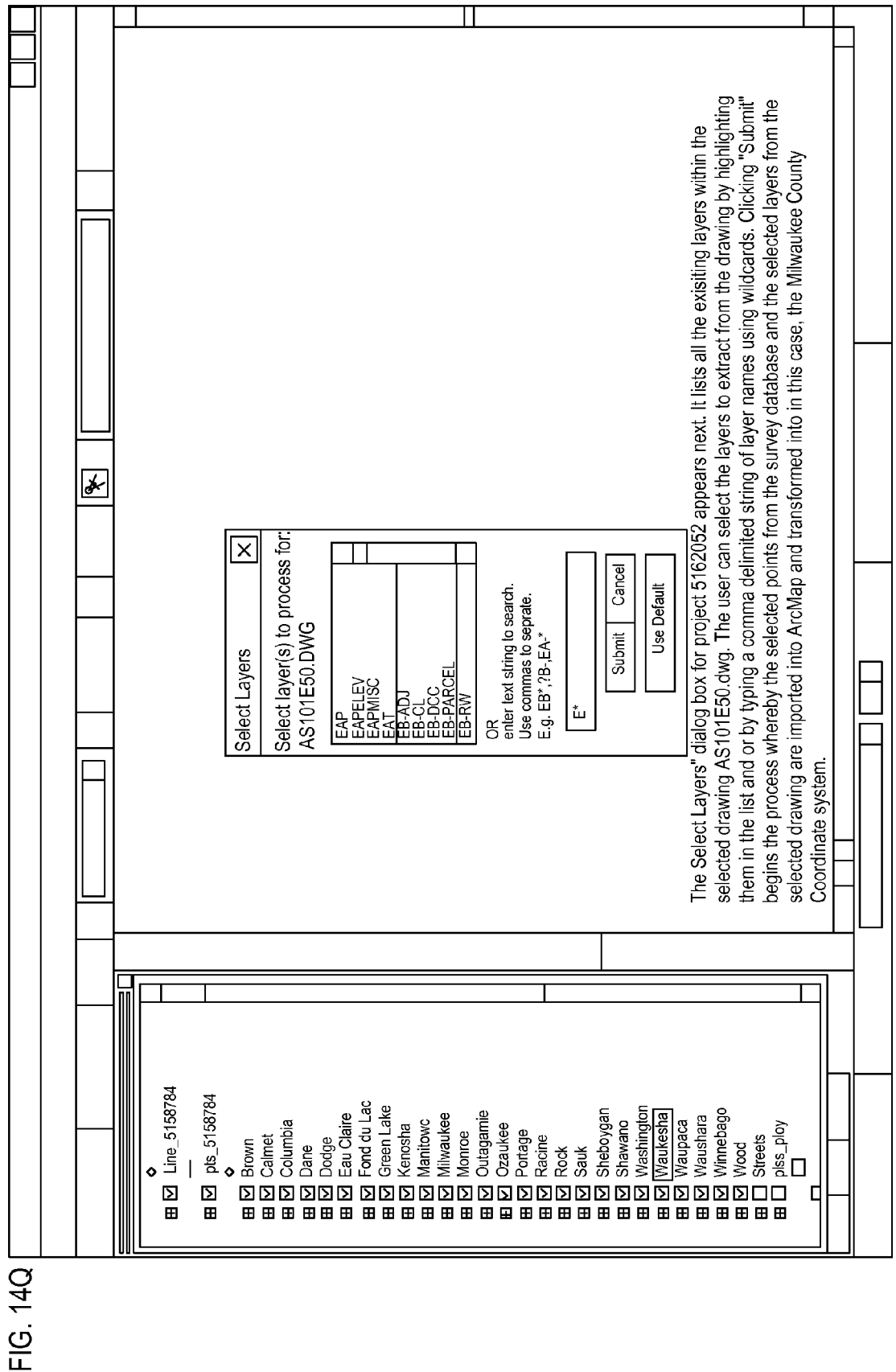
Figure 14R:
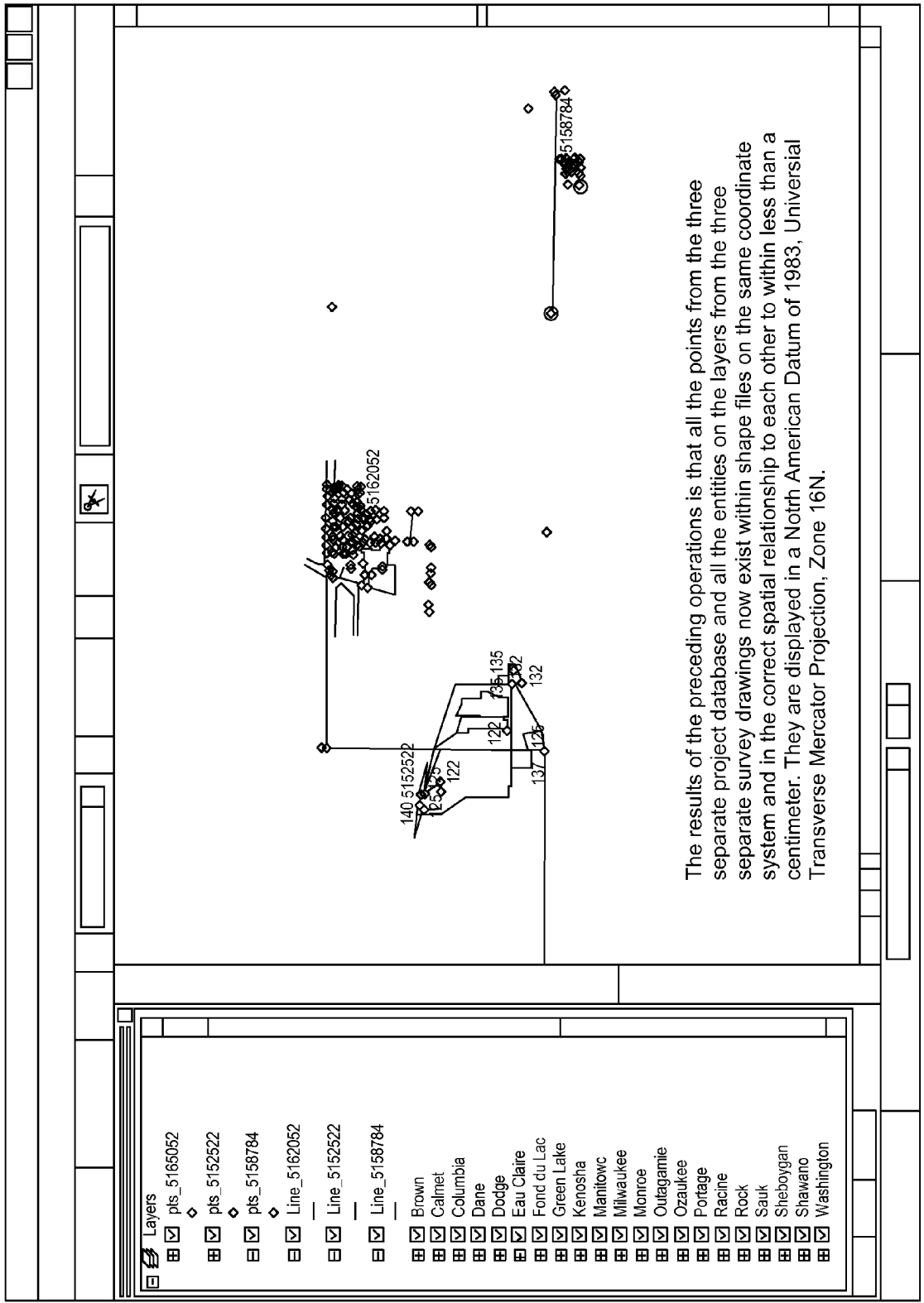
Figure 14S:
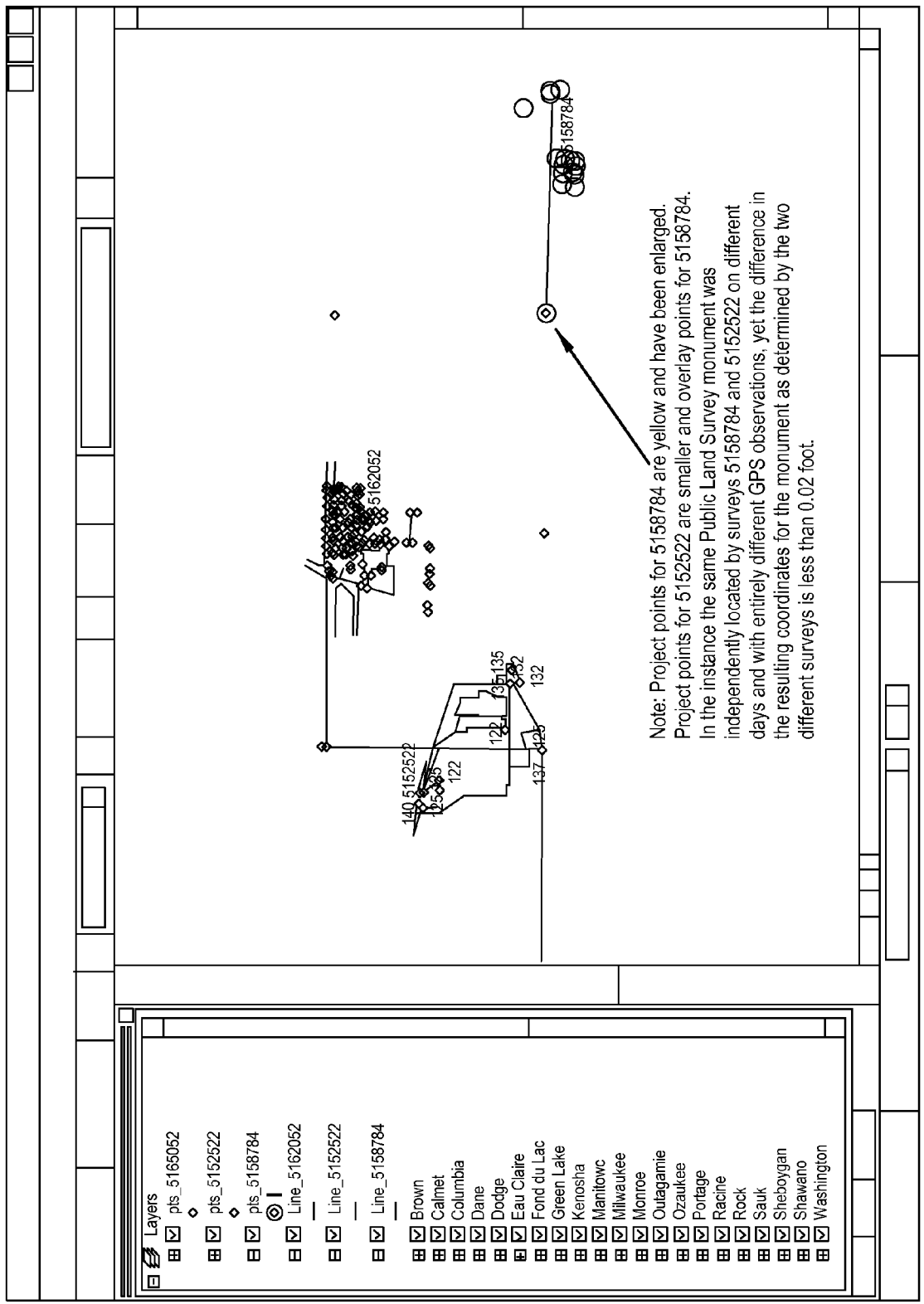
Figure 14T:
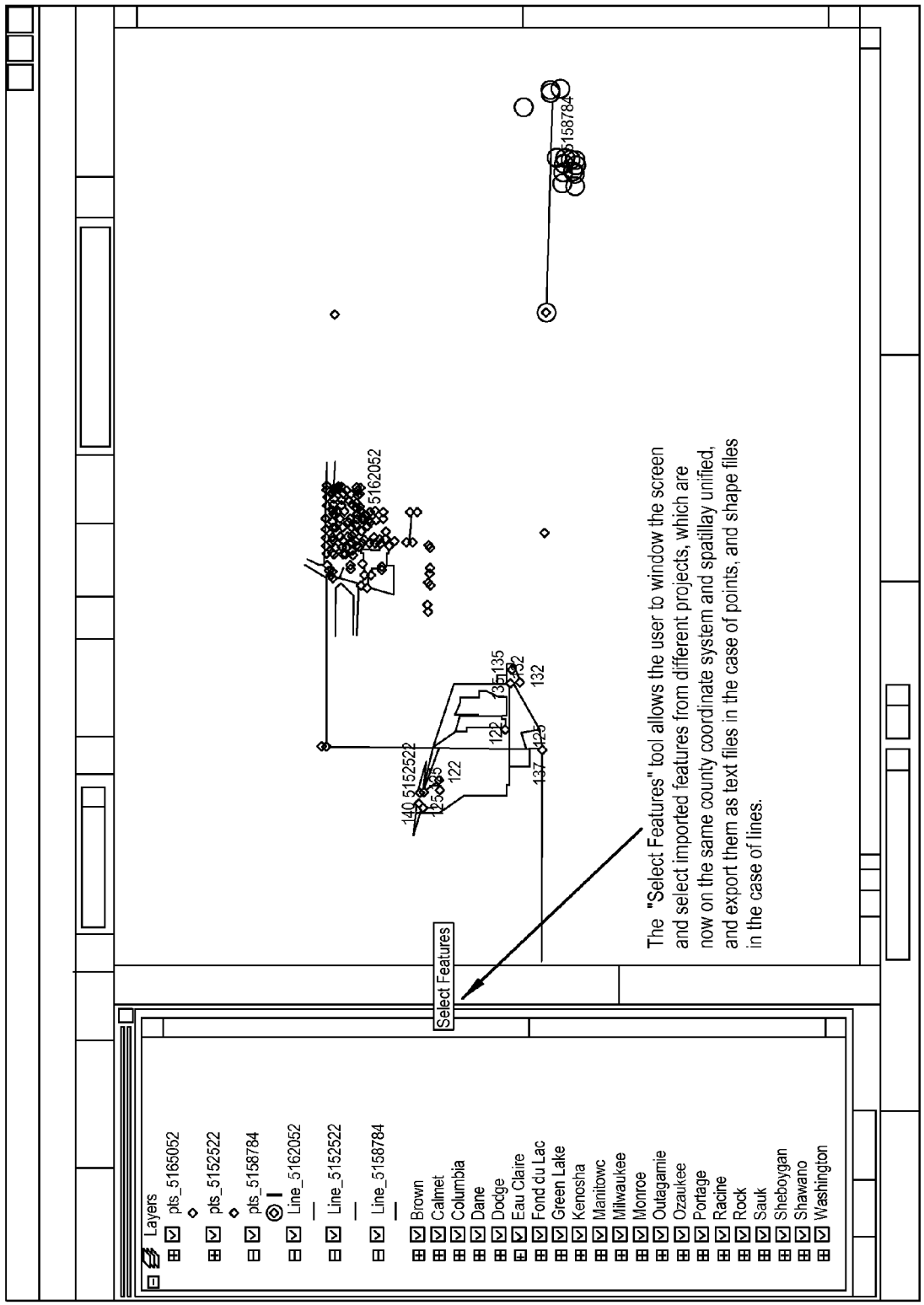
Figure 14U:
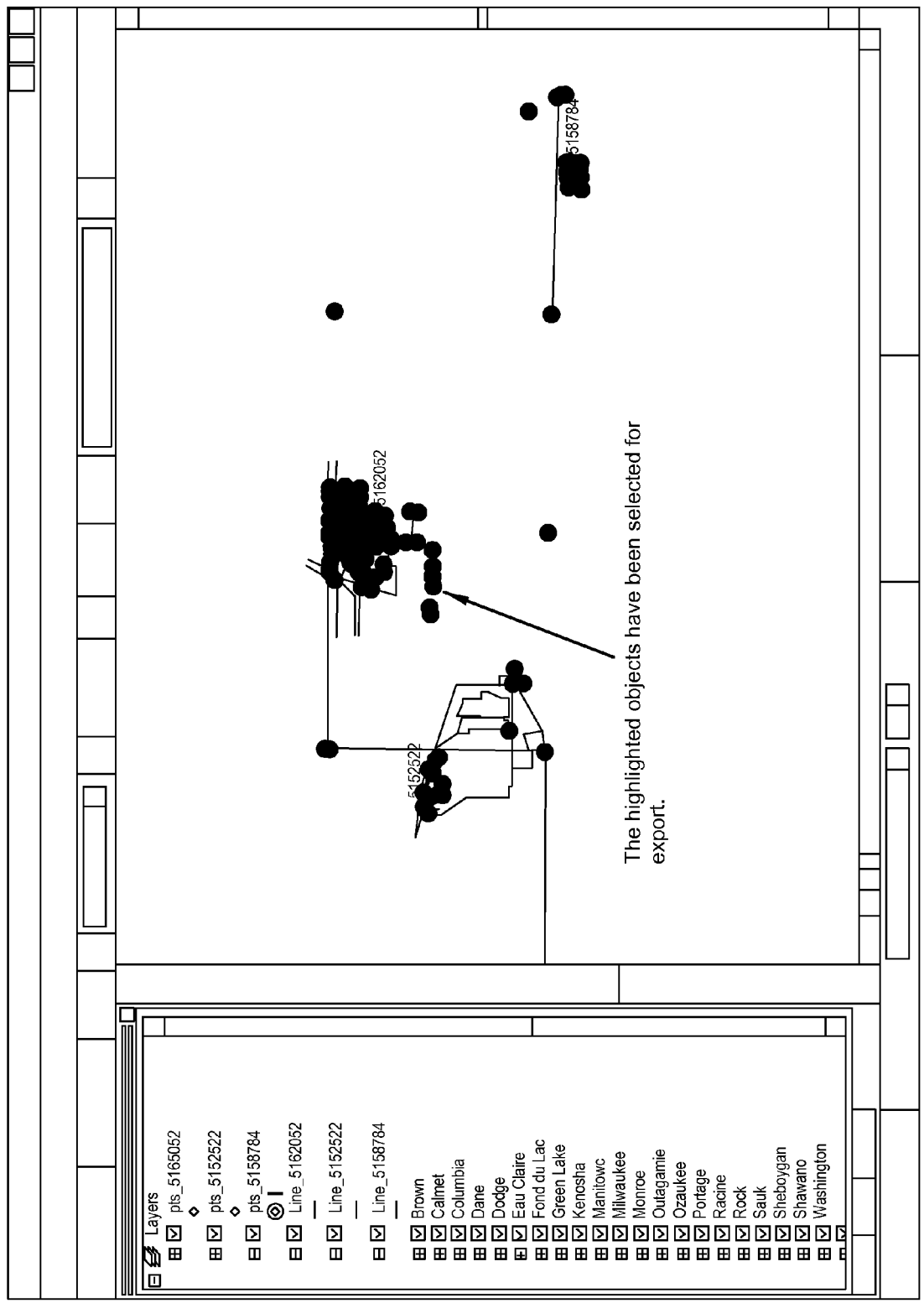
Figure 14V:
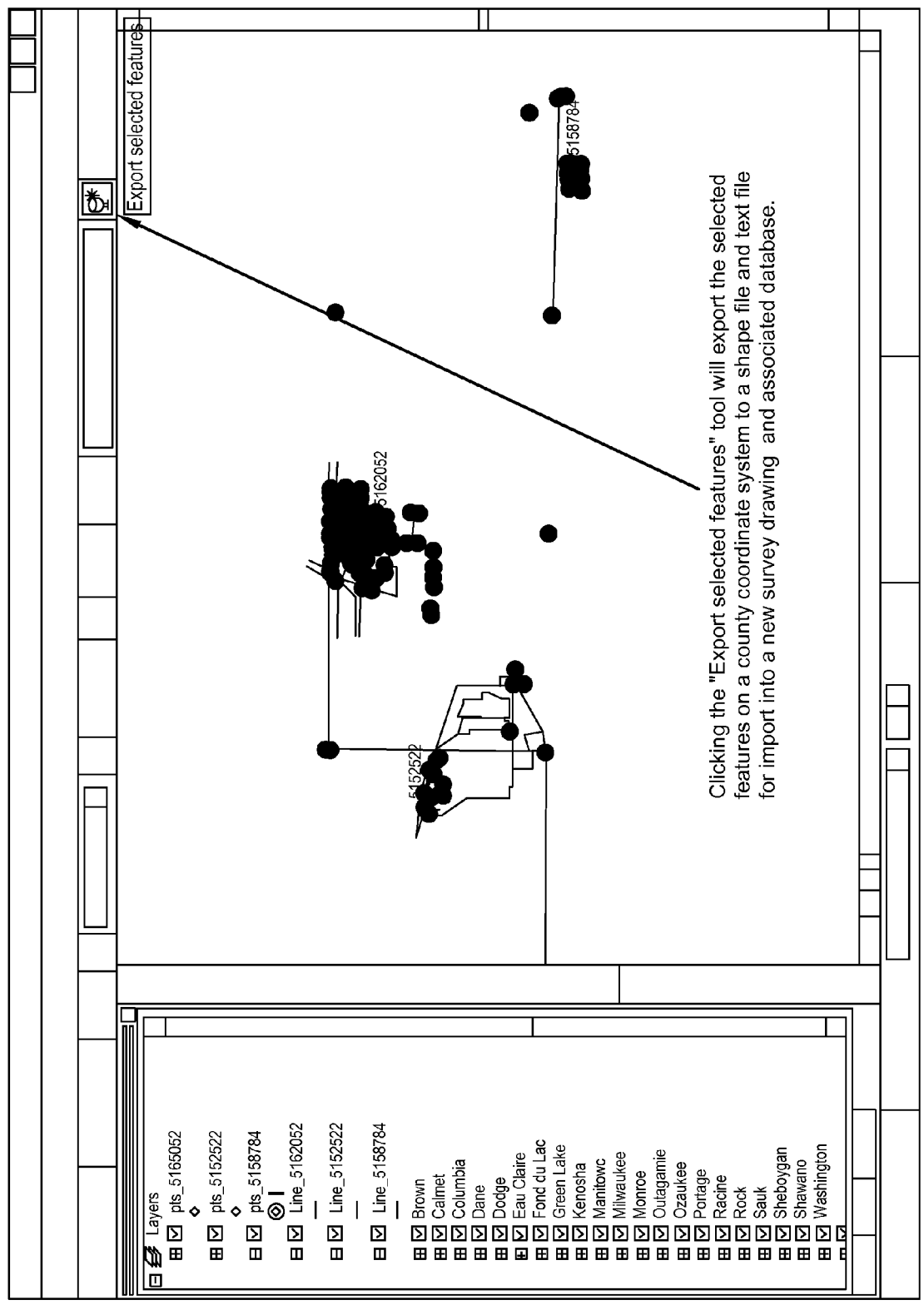
Figure 14W:
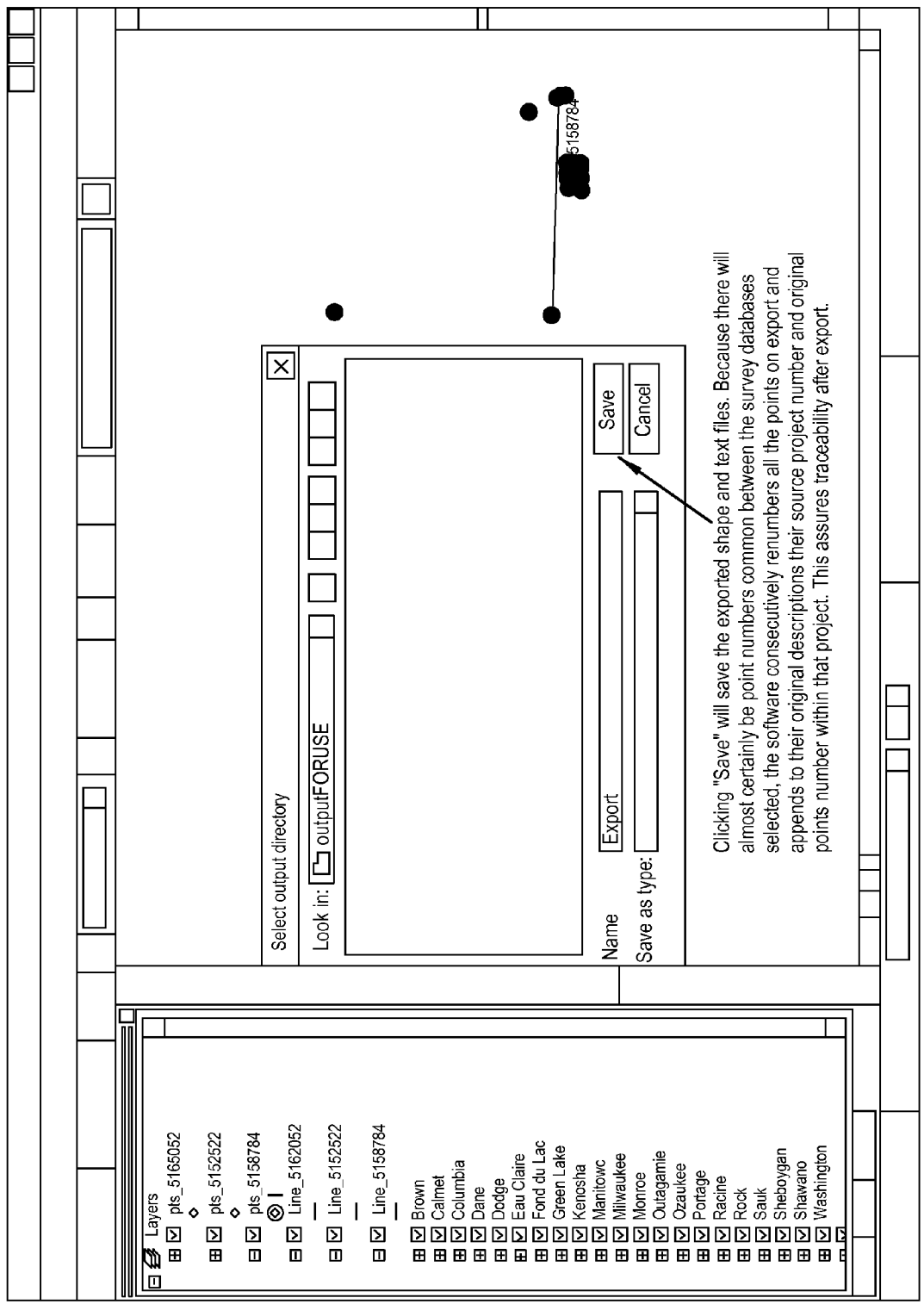

GIS software 30 may now be launched, as shown in FIG. 12. This software contains the routines and tools for completing the process of spatially relating the CAD drawings and associated point databases of different surveys. These tools are illustrated in FIGS. 12 and 13, and the screen shots attached collectively as FIGS. 14A to 14W.

The "Update County project points" tool updates a shape file with the information contained in the project point database. This shape file is used to display the location of surveys as project points on a map of the state of Wisconsin. These locations are based on the latitude and longitude of the WGS84 modified point description associated with each survey.

The "Default Layers" tool brings up the "View or Update Default Layers" dialog box that allows the user to set the default layers that will be imported into the GIS from the CAD drawing that is selected for each survey.

The "Default LDD Codes" tool brings up the "View or Update Default LDD Codes" dialog box. This box allows the user to set a default code list for selecting points from the point databases associated with the CAD drawings.

The "Select Project Points" tool allows the user to select the project points for which CAD drawings and associated point databases for different surveys will be transformed into shape files on county coordinates, thereby spatially relating them.

Additional dialog boxes may appear as shown in the screen shots.

Figure 6:
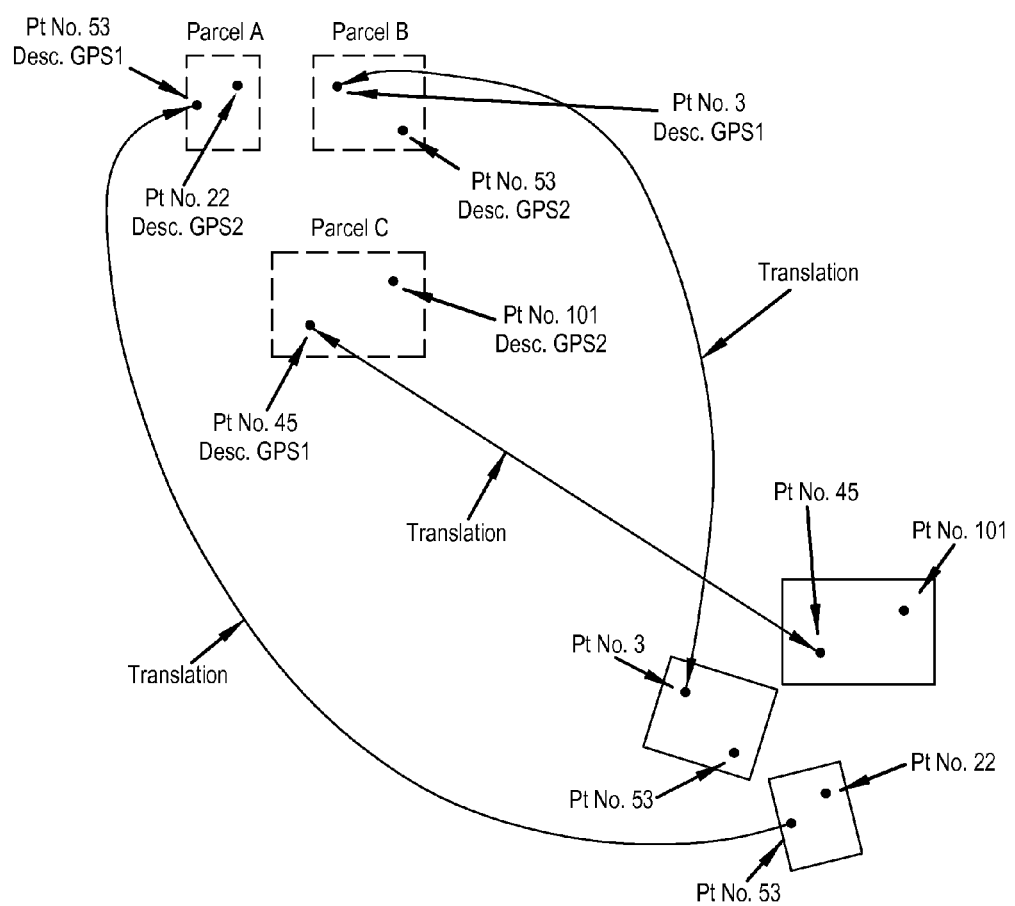
FIG. 6 is a depiction of the orientation of three parcels of land and a transformation of the drawing entities from deed or legal description-based coordinates into a single local grid system.

When a survey is selected in order to transform its CAD drawing and associated database, which are on a deed or legal description based Cartesian coordinate system, to a County Coordinate System, the GIS may go out to the GPS database containing the points in the county coordinate system. It searches this database for the points with "GPS1" and "GPS2" in the description field. The GIS extracts the point numbers for these two points. The GIS then goes out to the point database with the Cartesian coordinate system based on the deed or legal description that produced the survey and drawings. The GIS searches this database for the point numbers that were extracted for "GPS1" and "GPS2." The GIS then extracts CAD drawing layer entities and points from the associated point database and translates and rotates them based upon the coordinates for "GPS1" and "GPS2" in each coordinate system (See FIGS. 6 and 7).

It is also anticipated that a completely arbitrary grid coordinate system may be defined on the fly and selected to use as a basis for associating and/or registering two or more nearby survey projects. Such an arbitrary grid coordinate system might be used when the survey projects of interest are located across jurisdictional boundaries from each other, such as county or state lines. Often, surveys in different jurisdictions must be expressed in different coordinate systems as mandated by the local or state government. As an example, in Wisconsin, under a prior state defined and mandated county reference framework, a plurality of county level coordinate systems were defined (some covering a single county, others covering a plurality of counties), each using a slightly different defined ellipsoid. There are mathematical relationships defined between each local coordinate system and each defined ellipsoid, permitting coordinates to be transformed between the different county coordinate systems. However, for relating survey projects lying in different jurisdictions, coordinates of points within one or more of the projects in a first jurisdiction will need to be transformed into coordinates of a different jurisdiction, which may introduce coordinate distortions. Another reason to be able to define a grid coordinate system on the fly is that few states have county coordinate systems. Another reason is that even if county coordinate systems exist they may not, do to elevation differences and or the size of the county, result in grid distances being sufficiently close to ground distances over several miles in some areas. Another reason to be able to create local grid systems on the fly is so that the GIS will operate in any country regardless of the existence of suitable preexisting grid coordinate systems.

Figure 15:
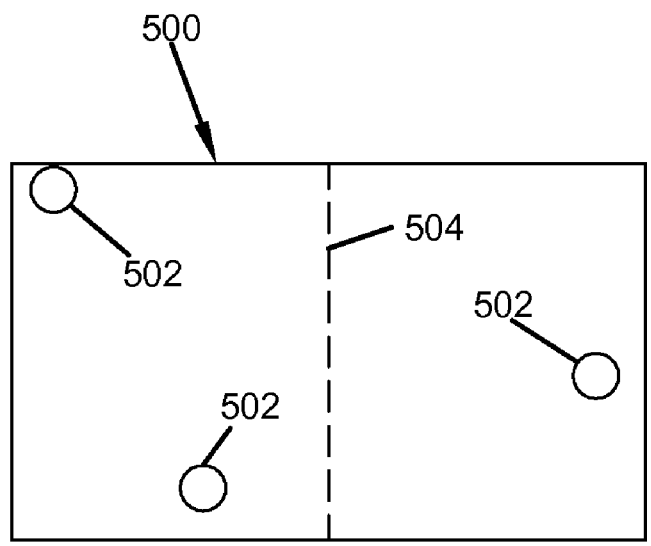
FIG. 15 is a schematic view of a virtual box drawn about a plurality of surveying projects represented as dots.

According to the present disclosure, an arbitrary coordinate system can be defined as needed to encompass only those survey projects of interest. With reference to FIG. 15, using a point 502 within each project, for example but not limited to, a point where a GPS base station was positioned, a virtual box 500 can be defined to encompass the northing and easting of each point 502 of the selected projects. A central location 504, such as a centerline, central meridian or center point of virtual box 500 can be derived. From this derived central line or point 504, an elevation for virtual box 500 with respect to a standard ellipsoid can be calculated. This elevation can be, for example, derived from a standardized national model or some other large scale consistent model. As an alternative, the virtual box elevation could be calculated as a mean of a derived elevation for a plurality of points within virtual box 500.

This derived elevation can be used to define the local map projection which may be used to provide a common basis for the projects within the virtual box. The local map projection can be based on whatever projection may be appropriate for the size and shape of the virtual box, which is in turn based on the relative positions of the survey projects to be transformed. Common examples of suitable projections include, but are not limited to Transverse Mercator and Lambert conformal conic projections. Any of these local projections may be based on the same ellipsoid with the derived elevation providing a mean height above the ellipsoid for the projection to be located. By defining the box to encompass all of the survey projects of interest, the local ad hoc grid coordinate system can be chosen to optimize a fit with a minimum grid-to-ground discrepancy, and to have the area (s) of least discrepancy between grid and ground distances within the local coordinate system projection to be centered over the area of interest. Larger, predefined coordinate systems and projections, such as a county-wide coordinate system may not be optimally sized or positioned for the particular area of interest. Or, the survey projects of interest may lay on different sides of a jurisdictional boundary to which the predefined local coordinate system and projection were made to fit, so that a non-optimal extension of the predefined coordinate system is necessary to encompass all of the projects.

Once this ad hoc local projection has been defined and calculated for the specific projects of interest, the process of defining translations and rotations can be performed, as described above. This would generally involve using the various GPS or other National Spatial Reference System (NSRS) positioned points within each project to define translations and rotations to be applied to calculate local grid coordinates for each point of each project. The translations and rotations can then be applied to the various projects to provide coordinates for each point in the local grid coordinate system. Again, as noted above, the selection of the local projection is intended to permit calculation of coordinates for the points within each project so that calculated grid distances derived from the coordinates will match the actual distances measured on the ground. It is desirable that, while the difference between grid-derived and ground-measured distances may not be absolutely identical, these distances should match within a specified level of significance.

Within the present disclosure, it is preferable that the match between grid and ground distance can be kept with at least the minimum level of accuracy mandated by the ALTA/ACSM (American Land Title Association/American Congress on Surveying and Mapping) standards, described above in the background. The minimum relative positional accuracy required to meet the standards are 0.07 feet (or 20 mm)+50 ppm. This is one commonly accepted manner of providing a specification for relative positional accuracy for land surveying where the standard has some variability based on the distance being measured on the ground.

Another commonly accepted manner of referring to relative positional accuracy in land surveying is to express it directly for a particular survey. Thus, the accuracy of the survey can then be compared to the standard to determine if the survey satisfies the minimum requirements. When the accuracy of a particular survey is expressed, it is typically expressed in terms of error per distance measured. This may commonly be shown as a dimensionless ratio. For example, when the relative positional accuracy for a survey is computed to be one foot over the distance of a mile, the accuracy of the survey could be stated as one part in five thousand two hundred and eighty.

Applying the ALTA/ACSM standard to a survey covering one mile, the minimum relative positional accuracy allowable would be (0.07 feet+((5280 feet/1,000,000)*50 ppm)), or 0.334 feet over one mile. Expressed as a dimensionless ratio, this is one part in fifteen thousand eight hundred and eight (1:15808). For a survey covering two miles, the equation would be (0.07 feet+((10560 feet/1,000,000)*50 ppm)), or 0.598 feet over two miles. Expressed as a dimensionless ratio, this is one part in seventeen thousand six hundred fifty eight (1:17658). Within the present disclosure, selection of the appropriate projection may allow the difference between the grid and ground distances to be held well below the ALTA/ACSM standards, for example, the accuracy may be held to one part in thirty thousand or even to one part in two hundred thousand or better.

If a virtual box is defined by projects that are separated too far geographically and/or elevation-wise to conform with a maximum allowable error between grid-derived and ground measured distances, the system and method of the present disclosure may still permit the projects to be moved with respect to each other but may highlight that the potential error is beyond the statutory or professionally mandated limits. While it may be desirable to have maximum potential error between surveys transformed to a common local coordinate system meet professional or statutory standards, there may also be other reasons for coordinating surveys that do not require that these standards be met.

Using the system and methods of the present disclosure, it is possible to adjust or transform any group of two or more survey projects to a common local coordinate system. Each of the survey projects to be transformed needs to have control points within the survey database that are tied to a national spatial reference system or some earth-centric or encompassing coordinate system. The control points within each survey project do not need to be directly referenced to the same coordinate system for the disclosed system and methods to operate. So long as the control points are referenced to coordinate systems or projections which can be mathematically related. If the control points are referenced in different coordinate systems or projections, it may be necessary to perform an intermediate coordinate transformation to one or more of the survey project point databases prior to the definition of the local coordinate system to which all of the survey projects will be related.

Various alternatives and embodiments are contemplated as being within the scope of the following claims particularly pointing out and distinctly claiming the subject matter regarded as the invention.

What is claimed is:

1. A method of transforming surveys, the method comprising:
   providing a plurality of surveys, each survey having a digital project file associated with the survey;
   reading the project files for each survey, the project files each including a plurality of points, each point having spatial coordinates defining the point's location within a local planar coordinate system, at least two of the plurality of survey projects having point locations defined in different local coordinate systems, and, at least two of the plurality of points within each project including additional spatial coordinates defining the point's location within a global coordinate system;
   defining a virtual box to encompass at least one point within each of the survey projects;
   determining an elevation of the virtual box above a reference surface of the global coordinate system based on the elevation of the survey projects above the reference surface of the global coordinate system;
   defining a map projection and coordinate system for the virtual box, based on the size of the virtual box and the elevation of the virtual box to minimize differences between a measured ground distance and a computed grid distance between any two points within the virtual box;
   using the global coordinate pairs for the at least two points within each survey project, calculate a translation and a rotation to transform coordinates from each local planar coordinate system to the coordinate system of the virtual box without a scale adjustment;

applying the translation and rotation for each local planar coordinate system to the points of any survey projects projected into that local planar coordinate system, to calculate spatial coordinates for each point in each survey project in the coordinate system of the virtual box;

writing the project file including the spatial coordinates in the coordinate system for the virtual box for each point in the associated survey to a storage medium.

2. The method of claim 1, wherein the differences between measured ground distance and calculated grid distance between any two points in the coordinate system of the virtual box are less than one part in thirty thousand.

3. The method of claim 1, wherein the differences between measured ground distance and calculated grid distance between any two points in the coordinate system of the virtual box are less than one part in two hundred thousand.

4. The method of claim 1, wherein the map projection of the virtual box is one of a Transverse Mercator projection or a Lambert conformal conic projection.

* * * * *